(12) United States Patent
Miyawaki et al.

(10) Patent No.: US 11,165,299 B2
(45) Date of Patent: Nov. 2, 2021

(54) COIL ASSEMBLING APPARATUS, COIL ASSEMBLING METHOD AND MANUFACTURING APPARATUS OF ELECTRICAL ROTATING MACHINE

(71) Applicant: ODAWARA ENGINEERING CO., LTD., Kanagawa (JP)

(72) Inventors: Noburo Miyawaki, Ashigarakami-gun (JP); Takayuki Mochizuki, Ashigarakami-gun (JP)

(73) Assignee: ODAWARA ENGINEERING CO., LTD., Kanagawa (JP)

( * ) Notice: Subject to any disclaimer, the term of this patent is extended or adjusted under 35 U.S.C. 154(b) by 170 days.

(21) Appl. No.: 16/530,278

(22) Filed: Aug. 2, 2019

(65) Prior Publication Data
US 2019/0356188 A1    Nov. 21, 2019

Related U.S. Application Data

(63) Continuation of application No. PCT/JP2018/018089, filed on May 10, 2018.

(30) Foreign Application Priority Data

Aug. 4, 2017 (JP) ............................ JP2017-151602

(51) Int. Cl.
*H02K 3/12* (2006.01)
*H02K 1/16* (2006.01)
(Continued)

(52) U.S. Cl.
CPC ............ *H02K 3/12* (2013.01); *H02K 1/16* (2013.01); *H02K 1/26* (2013.01); *H02K 15/0056* (2013.01); *H02K 15/024* (2013.01); *H02K 15/04* (2013.01)

(58) Field of Classification Search
CPC .. H02K 1/16; H02K 1/26; H02K 3/12; H02K 15/0056; H02K 15/024; H02K 15/04
(Continued)

(56) References Cited

U.S. PATENT DOCUMENTS

2015/0180319 A1* 6/2015 Kimura ............ H02K 15/0087
29/596
2019/0109523 A1* 4/2019 Miyazaki ............ H02K 15/04
2019/0190359 A1* 6/2019 Miyawaki ........... H02K 15/064

FOREIGN PATENT DOCUMENTS

CN    106953480 A    7/2017
JP    2003-134751 A    5/2003
(Continued)

OTHER PUBLICATIONS

Kubota et al., English Machine Translation of 2012-151996 (Year: 2012).*
(Continued)

*Primary Examiner* — Tulsidas C Patel
*Assistant Examiner* — Rashad H Johnson
(74) *Attorney, Agent, or Firm* — Westerman, Hattori, Daniels & Adrian, LLP

(57) ABSTRACT

The coil assembling apparatus includes a transport means for transporting in sequence a plurality of coil segments, each of the plurality of coil segments consisting of a pair of slot insertion portions and a linking portion for coupling the pair of slot insertion portions, a segment arrangement body capable of rotating around a center axis thereof and provided with a plurality of segment hold portions annularly arranged along a circumferential direction of the segment arrangement body, into which the plurality of coil segments transported by the transport means can be respectively inserted from an outer radial directions of the segment arrangement body, and a guide means for guiding to insert one slot insertion portion of the pair of slot insertion portions of each of the coil segments into one of the segment hold portions each time the segment arrangement body rotates by a first predetermined angle.

22 Claims, 32 Drawing Sheets

(51) Int. Cl.
*H02K 1/26* (2006.01)
*H02K 15/00* (2006.01)
*H02K 15/02* (2006.01)
*H02K 15/04* (2006.01)

(58) Field of Classification Search
USPC ....... 29/596; 310/12.24, 194, 202, 203, 208, 310/254.1
See application file for complete search history.

(56) References Cited

FOREIGN PATENT DOCUMENTS

| | | |
|---|---|---|
| JP | 2003-324911 A | 11/2003 |
| JP | 2004-173357 A | 6/2004 |
| JP | 2012-151996 A | 8/2012 |
| WO | 2016/104103 A1 | 6/2016 |

OTHER PUBLICATIONS

Fukuda et al., English Machine Translation of WO 2016/104103 (Year: 2016).*

International Search Report dated Aug. 7, 2018, issued in counterpart International Application No. PCT/JP2018/018089, with English Translation. (3 pages).

Office Action dated Jan. 22, 2021, issued in counterpart CN Application No. 201880012303.1. (14 pages).

Extended (Supplementary) European Search Report dated Apr. 9, 2021, issued in counterpart EP Application No. 18841500.4. (9 pages).

* cited by examiner

COIL ASSEMBLING APPARATUS, COIL ASSEMBLING METHOD AND MANUFACTURING APPARATUS OF ELECTRICAL ROTATING MACHINE

FIELD OF THE INVENTION

The present invent ion relates to a coil assembling apparatus and a coil assembling method used for coil formation of a stator and a rotor in an electrical rotating machine such as a motor or a generator, and to a manufacturing apparatus of the electrical rotating machine.

BACKGROUND ART

Known is a segment-type coil as a stator coil or a rotor coil of the electrical rotating machine. This segment coil is formed by inserting a plurality of segments (hairpins), each obtained by bending a wire rod in a U-shape, into a plurality of slots arranged along the circumferential direction of the stator or the rotor, respectively, and by joining together free ends of these inserted segments by welding. Since the winding process of wire is unnecessary to carry out in the segment-type coil, it is possible to improve the space factor of slot in comparison with the conventional winding type coil and thus a small and high output rotating machine can be obtained.

When assembling such segment type coil, it was possible to insert each of a plurality of coil segments formed in a predetermined shape into each slot of the stator or the rotor. However, this method took a great deal of time and effort and therefore it was impossible to improve production efficiency. Thus, previously, the plurality of coil segments were beforehand arrayed in an alignment device in annular arrangement, and then the arrayed plurality of coil segments were drew out from the alignment device and inserted into the slots of the stator or the rotor, respectively.

In Patent Document 1, for example, a coil formation method using a cylindrical arrangement device with a plurality of slots radially inclined is disclosed. According to this method, one of slot insertion portions of the coil segment is inserted into the inner port of one slot formed along the axial direction of the arrangement device, and the other one of the slot insertion portions is inserted into the outer port of the other one slot that is distantly positioned from the above-mentioned slot in the circumferential direction by a predetermined distance. After performing these insertions of the slot insertion portions of the plurality of coil segments, according to this coil formation method, the slot insertion portions inserted into the respective outer ports are shifted to the inner port side so as to form a segment assembly with circumferentially arranged two layers.

RELATED ART DOCUMENT

Patent Document

Patent Document 1: Japanese Patent Publication No. 2003-134751A

SUMMARY OF THE INVENTION

Problem to be Solved by the Invention

However, according to the coil formation method described in Patent Document 1, after repeating the operations of moving a pair of slot insertion portions of each coil segment along the axial direction of the alignment device and the operations of inserting the slot insertion portions into the two slots, respectively, it was necessary to rotate the slot insertion portions inserted into the respective slots around the axis so that the inserted slot insertion portions were moved to the inner port side. Thus, it was quite difficult to perform efficient and quick coil assembling. Also, according to this coil formation method, since only two-layered segment assembly could be formed in each process, it was necessary to perform many processes when the multilayered segment assembly, for example, was to be formed and thereby it was impossible to expect an efficient coil assembling.

It is therefore an object of the present invention to provide a coil assembling apparatus, a coil assembling method and a manufacturing apparatus of an electrical rotating machine, whereby it is possible to efficiently and quickly assemble a coil consisting of a plurality of coil segments.

Another object of the present invention is to provide a coil assembling apparatus, a coil assembling method and a manufacturing apparatus of an electrical rotating machine, whereby it is possible to easily and quickly assemble a coil consisting of a multilayered coil segments.

Means to Solve the Problem

According to the present invention, a coil assembling apparatus includes a transport means for transporting in sequence a plurality of coil segments, each of the plurality of coil segments consisting of a pair of slot insertion portions extending substantially in parallel with each other and a linking portion for coupling the pair of slot insertion portions, a segment arrangement body capable of rotating around a center axis thereof and provided with a plurality of segment hold portions annularly arranged along a circumferential direction of the segment arrangement body, into which the plurality of coil segments transported by the transport means can be respectively inserted from an outer radial directions of the segment arrangement body, and a guide means for guiding to insert one slot insertion portion of the pair of slot insertion portions of each of the coil segments into one of the segment hold portions each time the segment arrangement body rotates by a first predetermined angle, and for guiding to insert the other one slot insertion portion of the pair of slot insertion portions into the other one of the segment hold portions when the segment arrangement body rotates by a second predetermined angle from the insertion of the one slot insertion portion.

On the segment arrangement body, a plurality of segment hold portions are annularly arranged along the circumferential direction of the segment arrangement body. A plurality of coil segments can be inserted respectively into these segment hold portions from the outer radial directions of the segment arrangement body. Thus, the coil segments can be smoothly inserted into these segment hold portions annularly arranged along the circumferential direction from the outer radial directions. As a result, it is easy to arrange these coil segments in annular form. Even more particularly, the guide means guides to insert one slot insertion portion of the coil segment into one of the segment hold portions each time the segment arrangement body rotates by a first predetermined angle, and guides to insert the other one slot insertion portion into the other one of the segment hold portions when the segment arrangement body rotates by a second predetermined angle from the insertion. Therefore, since the coil segments transported in sequence are guided to directly insert into the segment hold portions in response to the rotation of the segment arrangement body, it is possible to efficiently and quickly assemble a coil in annular form. Also, since the coil segments transported in sequence are sequentially inserted into the segment hold portions, it is possible to easily and quickly assemble a coil consisting of a multi-layered coil segments.

Preferably, the guide means is configured that the one slot insertion portion of the pair of slot insertion portions passes through between the guide means and the segment arrangement body, and that the other one slot insertion portion of the pair of slot insertion portions passes through the opposite side of the guide means with respect to the segment arrangement body.

In this case, more preferably, the guide means has a single layer configuration consisting of a single guide member.

It is also preferred that the guide means has a two layer configuration consisting of an outer guide member and an inner guide member located nearer than the outer guide member with respect to the center axis of the segment arrangement body, and that a length of the inner guide member along the circumferential direction of the segment arrangement body is shorter than a length of the outer guide member along the circumferential direction of the segment arrangement body.

It is further preferred that the transport means is configured to grip the other one slot insertion portion of the pair of slot insertion portions for transporting each of the plurality of coil segments so that the other one slot insertion portion of the pair of slot insertion portions is laid on the guide means in the state where the one slot insertion portion is inserted into one segment hold portion of the plurality of segment hold portions.

It is preferred that the segment arrangement body is arranged so that the rotation center axis thereof is horizontally-supported, and that the guide means is arranged above the segment arrangement body. Thus, the coil segment can be automatically inserted into the segment hold portion of the segment arrangement body by its own weight.

It is also preferred that the plurality of segment hold portions of the segment arrangement body are arranged between a plurality of blades, which are extended to a radial direction of the segment arrangement body and annularly arranged along a circumferential direction of the segment arrangement body, and that heights in the radial direction of the plurality of blades are variable depending on the number of layers of the plurality of coil segments.

It is further preferred that the apparatus further includes a separation preventing means for supporting the plurality of coil segments arranged in the plurality of segment hold portions of the segment arrangement body so as to prevent separation of the plurality of coil segments from the plurality of segment hold portions.

It is still further preferred that the separation preventing means has an abutment member for performing abutment along the peripheral surface of the segment arrangement body, an abutment pressure of the abutment member being adjustable depending on the number of layers of the plurality of coil segments.

In this case, it is preferred that the abutment member includes a belt body for performing co-rotation depending on the rotation of the segment arrangement body.

It is further preferred that the apparatus further includes a push-out mechanism for pushing out the plurality of coil segments held in the plurality of segment hold portions of the segment arrangement body, to the axial direction of the segment arrangement body.

According to the present invention, also, a coil assembling method includes a step of preparing a segment arrangement body provided with a plurality of segment hold portions annularly arranged along a circumferential direction of the segment arrangement body, into which a plurality of coil segments can be respectively inserted from an outer radial directions of the segment arrangement body, each of the plurality of coil segments consisting of a pair of slot insertion portions extending substantially in parallel with each other and a linking portion for coupling the pair of slot insertion portions, a step of guiding to insert one slot insertion portion of the pair of slot insertion portions of each of the coil segments into one of the segment hold portions each time the segment arrangement body rotates by a first predetermined angle, and a step of guiding to insert the other one slot insertion portion of the pair of slot insertion portions into the other one of the segment hold portions when the segment arrangement body rotates by a second predetermined angle from the insertion of the one slot insertion portion.

The segment arrangement body, on which a plurality of segment hold portions are annularly arranged along the circumferential direction of the segment arrangement body is used, and a plurality of coil segments can be respectively into these segment hold portions from the outer radial directions of the segment arrangement body. Thus, the coil segments can be smoothly inserted into these segment hold portions annularly arranged along the circumferential direction from the outer radial directions, and as a result, it is easy to arrange these coil segments in annular form. Even more particularly, one slot insertion portion of the coil segment is guided and inserted into one of the segment hold portions each time the segment arrangement body rotates by a first predetermined angle, and the other one slot insertion portion is guided and inserted into the other one of the segment hold portions when the segment arrangement body rotates by a second predetermined angle from the insertion. Therefore, since the coil segments transported in sequence are guided to directly insert into the segment hold portions in response to the rotation of the segment arrangement body, it is possible to efficiently and quickly assemble a coil in annular form. Also, since the coil segments transported in sequence are sequentially inserted into the segment hold portions, it is possible to easily and quickly assemble a coil consisting of a multilayered coil segments.

According to the present invention, further, a manufacturing apparatus of an electrical rotating machine includes a coil assembling apparatus. The coil assembling apparatus includes a transport means for transporting in sequence a plurality of coil segments, each of the plurality of coil segments consisting of a pair of slot insertion portions extending substantially in parallel with each other and a linking portion for coupling the pair of slot insertion portions, a segment arrangement body capable of rotating around a center axis thereof and provided with a plurality of segment hold portions annularly arranged along a circumferential direction of the segment arrangement body, into which the plurality of coil segments transported by the transport means can be respectively inserted from an outer radial directions of the segment arrangement body, and a guide means for guiding to insert one slot insertion portion of the pair of slot insertion portions of each of the coil segments into one of the segment hold portions each time the segment arrangement body rotates by a first predetermined angle, and for guiding to insert the other one slot insertion portion of the pair of slot insertion portions into the other one of the segment hold portions when the segment arrangement body rotates by a second predetermined angle from the insertion of the one slot insertion portion.

On the segment arrangement body, a plurality of segment hold portions are annularly arranged along the circumferential direction of the segment arrangement body. A plurality of coil segments can be inserted respectively into these segment hold portions from the outer radial directions of the segment arrangement body. Thus, the coil segments can be smoothly inserted into these segment hold portions annularly arranged along the circumferential direction from the outer radial directions. As a result, it is easy to arrange these coil segments in annular form. Even more particularly, the guide means guides to insert one slot insertion portion of the coil segment into one of the segment hold portions each time the segment arrangement body rotates by a first predetermined angle, and guides to insert the other one slot insertion portion into the other one of the segment hold portions when the segment arrangement body rotates by a second predetermined angle from the insertion. Therefore, since the coil segments transported in sequence are guided to directly insert into the segment hold portions in response to the rotation of the segment arrangement body, it is possible to efficiently and quickly assemble a coil in annular form. Also, since the coil segments transported in sequence are sequentially inserted into the segment hold portions, it is possible to easily and quickly assemble a coil consisting of a multi-layered coil segments.

According to the present invention, still further, a manufacturing apparatus of an electrical rotating machines includes a wire rod providing section for supplying a linear wire rod, a first bending section for bending the linear wire rod supplied from the wire rod providing section, in a plane to form a predetermined shape consisting of a pair of slot insertion portions extending substantially in parallel with each other and a linking portion for coupling the pair of slot insertion portions, a second bending section for bending the wire rod bent in the first bending section, in a plane perpendicular to the plane, and a coil assembling apparatus for assembling coil segments bent in the second bending section, in line with slots of the electrical rotating machine. The coil assembling apparatus includes a transport means for transporting in sequence a plurality of coil segments, each of the plurality of coil segments consisting of a pair of slot insertion portions extending substantially in parallel with each other and a linking portion for coupling the pair of slot insertion portions, a segment arrangement body capable of rotating around a center axis thereof and provided with a plurality of segment hold portions annularly arranged along a circumferential direction of the segment arrangement body, into which the plurality of coil segments transported by the transport means can be respectively inserted from an outer radial directions of the segment arrangement body, and a guide means for guiding to insert one slot insertion portion of the pair of slot insertion portions of each of the coil segments into one of the segment hold portions each time the segment arrangement body rotates by a first predetermined angle, and for guiding to insert the other one slot insertion portion of the pair of slot insertion portions into the other one of the segment hold portions when the segment arrangement body rotates by a second predetermined angle from the insertion of the one slot insertion portion.

It is preferred that the guide means is configured that the one slot insertion portion of the pair of slot insertion portions passes through between the guide means and the segment arrangement body, and that the other one slot insertion portion of the pair of slot insertion portions passes through the opposite side of the guide means with respect to the segment arrangement body.

In this case, it is preferred that the guide means has a single layer configuration consisting of a single guide member.

It is also preferred that the guide means has a two layer configuration consisting of an outer guide member and an inner guide member located nearer than the outer guide member with respect to the center axis of the segment arrangement body, and that a length of the inner guide member along the circumferential direction of the segment arrangement body is shorter than a length of the outer guide member along the circumferential direction of the segment arrangement body.

It is further preferred that the transport means is configured to grip the other one slot insertion portion of the pair of slot insertion portions for transporting each of the plurality of coil segments so that the other one slot insertion portion of the pair of slot insertion portions is laid on the guide means in the state where the one slot insertion portion is inserted into one segment hold portion of the plurality of segment hold portions.

It is still further preferred that the segment arrangement body is arranged so that the rotation center axis thereof is horizontally-supported, and that the guide means is arranged above the segment arrangement body.

It is further preferred that the plurality of segment hold portions of the segment arrangement body are arranged between a plurality of blades, which are extended to a radial direction of the segment arrangement body and annually arranged along a circumferential direction of the segment arrangement body, and that heights in the radial direction of the plurality of blades are variable depending on the number of layers of the plurality of coil segments.

It is further preferred that the apparatus further includes a separation preventing means for supporting the plurality of coil segments arranged in the plurality of segment hold portions of the segment arrangement body so as to prevent separation of the plurality of coil segments from the plurality of segment hold portions.

It is further preferred that the separation preventing means has an abutment member for performing abutment along the peripheral surface of the segment arrangement body, an abutment pressure of the abutment member being adjustable depending on the number of layers of the plurality of coil segments.

In this case, it is preferred that the abutment member includes a belt body for performing co-rotation depending on the rotation of the segment arrangement body.

It is also preferred that the apparatus further includes a push-out mechanism for pushing out the plurality of coil segments held in the plurality of segment hold portions of the segment arrangement body, to the axial direction of the segment arrangement body.

Effect of the Invention

According to the present invention, the coil segments can be smoothly inserted into these segment hold portions annularly arranged along the circumferential direction from the outer radial directions, and therefore, it is easy to arrange these coil segments in annular form. Even more particularly, the guide means guides to insert one slot insertion portion of the coil segment into one of the segment hold portions each time the segment arrangement body rotates by a first predetermined angle, and guides to insert the other one slot insertion portion into the other one of the segment hold portions when the segment arrangement body rotates by a second predetermined angle from the insertion. Therefore, since the coil segments transported in sequence are guided to directly insert into the segment hold portions in response to the rotation of the segment arrangement body, it is possible to efficiently and quickly assemble a coil in annular form. Also, since the coil segments transported in sequence are sequentially inserted into the segment hold portions, it is possible to easily and quickly assemble a coil consisting of a multilayered coil segments.

EMBODIMENTS FOR CARRYING OUT THE INVENTION

Hereinafter embodiments of the present invention will be described with reference to the drawings. In the following embodiments, a rectangular wire with a quadrangular cross-section will be used as for a wire rod. However, a single line wire or a stranded line wire with any shaped cross-section such as for example a circular-shaped cross-section, a square-shaped cross-section, a polygonal-shaped cross-section or other-shaped cross-section may be applicable as for the wire rod, according to the present invention.

Figure 1:
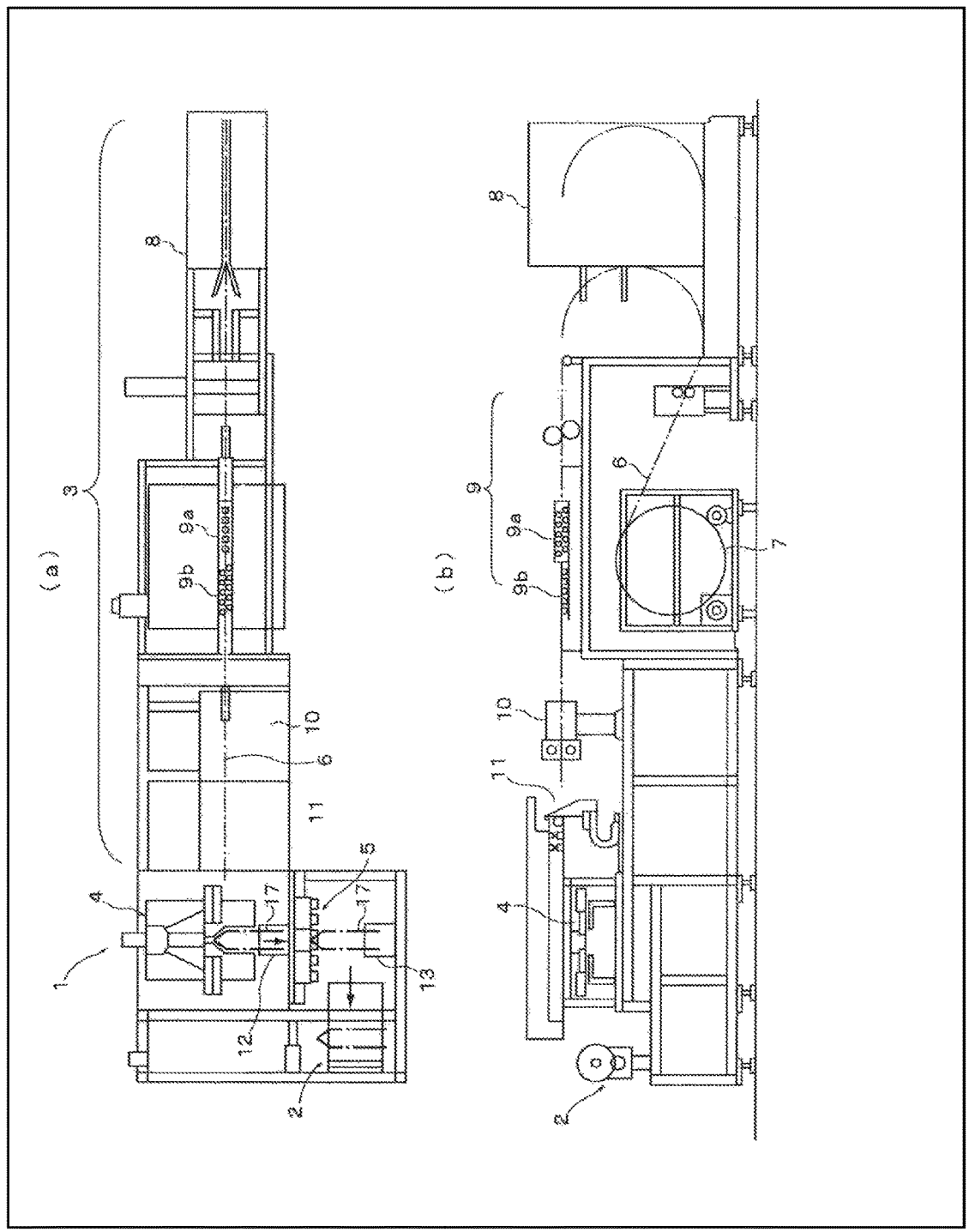
FIG. 1 is views schematically illustrating a partial constitution of a manufacturing apparatus of an electrical rotating machine in a first embodiment according to the present invention, in which (a) shows a plane view and (b) shows a side view.

As shown in FIG. 1, a manufacturing apparatus 100 of an electrical rotating machine of a first embodiment according to the present invention has a coil segment shaping section 1, and a coil assembling section 2 for assembling coil segments formed in the coil segment shaping section 1 in line with slots circularly arranged along the circumferential direction of the electrical rotating machine. The coil segment shaping section 1 has a wire rod providing section 3, a first bending section 4 and a second bending section 5 for forming step portion in the crank shape. The first bending section 4 bends a separated linear wire rod with a predetermined length, supplied from the wire rod providing section 3, into a predetermined shape (U-shape for example) in the same plane (in a horizontal plane in this embodiment). The second bending section 5 bends a coil segment (first bent body) bent in the first bending section 4 in a plane (in a perpendicular plane in this embodiment) perpendicular to the axis of the coil segment and to the above-mentioned same plane. Also, the second bending section 5 provides a special shape (step shape or crank shape for example) to the top end portion of the coil segment in order to shift or misalign a slot insertion portion of the coil segment in a radial direction of the core.

The wire rod providing section 3 has a bobbin 7 on which a continuous wire rod 6 of a rectangular wire with the surface coated by an insulation layer is wound, a feed direction switching section 8 for drawing the continuous wire rod 6 from the bobbin 7 and for changing its feed direction, a corrective transporting section 9 including a plurality of roller pairs 9a for pinching the flatwise side of the continuous wire rod 6 to transport the pinched wire rod and a plurality of roller pairs 9b for pinching the edgewise side of the continuous wire rod 6 to transport the pinched wire rod, for correcting a longitudinal distortion of the wire rod, a peeling section 10 for stripping the insulation layer coated around the distortion-corrected wire rod 6, in which peeling areas are located at both end portions of the wire rod to keep a predetermined distance with each other, and a cutting section 11 for cutting the continuous wire rod 6 passed through the peeling section 10 at positions located along the wire rod to keep the predetermined distance with each other into separated wire rods. The peeling section 10 in this first embodiment has a configuration to strip the coated insulation layer by a laser beam. A peeling area stripped by the peeling section 10 includes respective two areas of the separated wire rod and the neighbor separated wire rod. Thus, the cutting section 11 is constituted to cut the continuous wire rod 6 at the center position of the peeling area. Note that, as for the peeling section 10, any constitution to strip the coated insulation layer using mechanical cutting or clipping may be utilized other than that using a laser beam.

The separated wire rod 6 bent by the first bending section 4, that is, a U-shaped first bent body is transferred to the second bending section 5 by means of a feed mechanism 12 located between the first bending section 4 and the second bending section 5. The feed mechanism 12 has a pair of chucking portions (not shown) formed by air cylinders. The pair of chucking portions will be waiting in the state where their chuck pieces are open to cover the region into which both leg parts (a pair of slot insertion portions) of the first bent body are turned by the bending. After the chucking portions grip the both leg parts of the first bent body, the feed mechanism 12 moves upward to detach the first bent body from the first bending section 4 and then transfers the first bent body to the second bending section 5. The end portions of the both leg parts of the first bent body transferred by means of the feed mechanism 12 are then held by a hold member 13. The hold member 13 has configurations of a pair of chucking portions formed by air cylinders for gripping the pair of slot insertion portions as well as the feed mechanism 12. After the first bent body is delivered to the hold member 13, the feed mechanism 12 backs away so that the coil end portion (linking portion) of the first bent body becomes free. Under this state, bending operation including bending operation for forming a step shape (a crank shape) in the coil end portion of the first bent body is performed by the second bending section 5. In the configuration shown in FIG. 1, the feed direction switching section 8, the corrective transporting section 9, the peeling section 10 and the cutting section 11 in the wire rod providing section 3, and the first bending section 4 are aligned along the lateral direction in FIG. 1 (a), the second binding section 5 is arranged along the perpendicular direction with respect to the first bending section 4 (the longitudinal direction in FIG. 1 (a)), and the coil assembling section 2 is arranged along the perpendicular direction with respect to the second bending section 5 (lateral direction in FIG. 1 (a)). However, the feed direction switching section 8, the corrective transporting section 9, the peeling section 10, the cutting section 11, the first bending section 4, the second binding section 5 and the coil assembling section 2 may be aligned along the lateral direction in FIG. 1 (a). That is, there is no limitation in the arrangement of the coil segment shaping section and the coil assembling section, in other words, there is no limitation in the layout if the coil formation concludes in a single manufacturing apparatus.

Hereinafter, configurations and operations of a coil segment assembling portion of the coil assembling section 2 in the first embodiment will be described with reference to FIG. 2A to FIG. 8.

The coil assembling section 2 has a segment transport means 110 (corresponding to the transport means according to the present invention) for sequentially transporting or feeding coil segments 17S, as shown in FIG. 3 to FIG. 5, and FIG. 8, a segment arrangement drum 105 (corresponding to the segment arrangement body according to the present invention) with a plurality of segment hold portions 109 annularly arranged along the circumferential direction, into which the plurality of coil segments 17S can be respectively inserted from the outer radial directions, as shown in FIG.

Figure 2A:
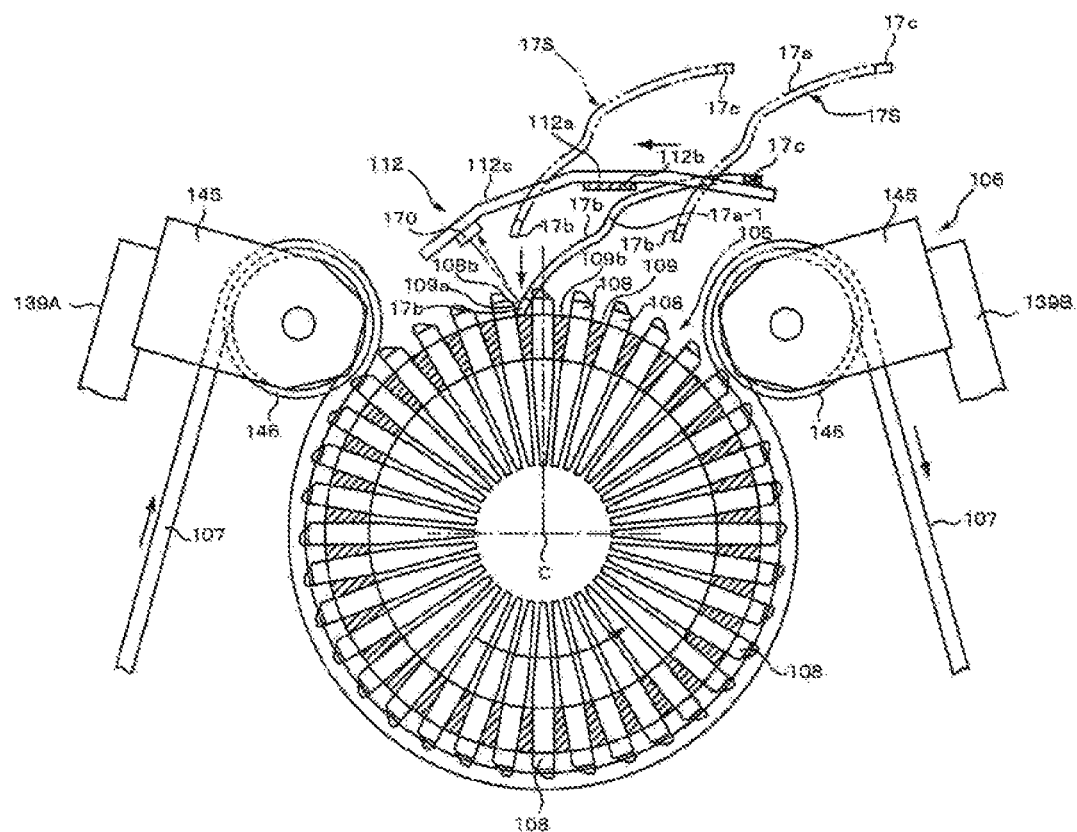
FIG. 2A is an essential part sectional view illustrating the operations of guiding and inserting a first coil segment into a segment hold portion of the coil assembling apparatus in the first embodiment.
Figure 2B:
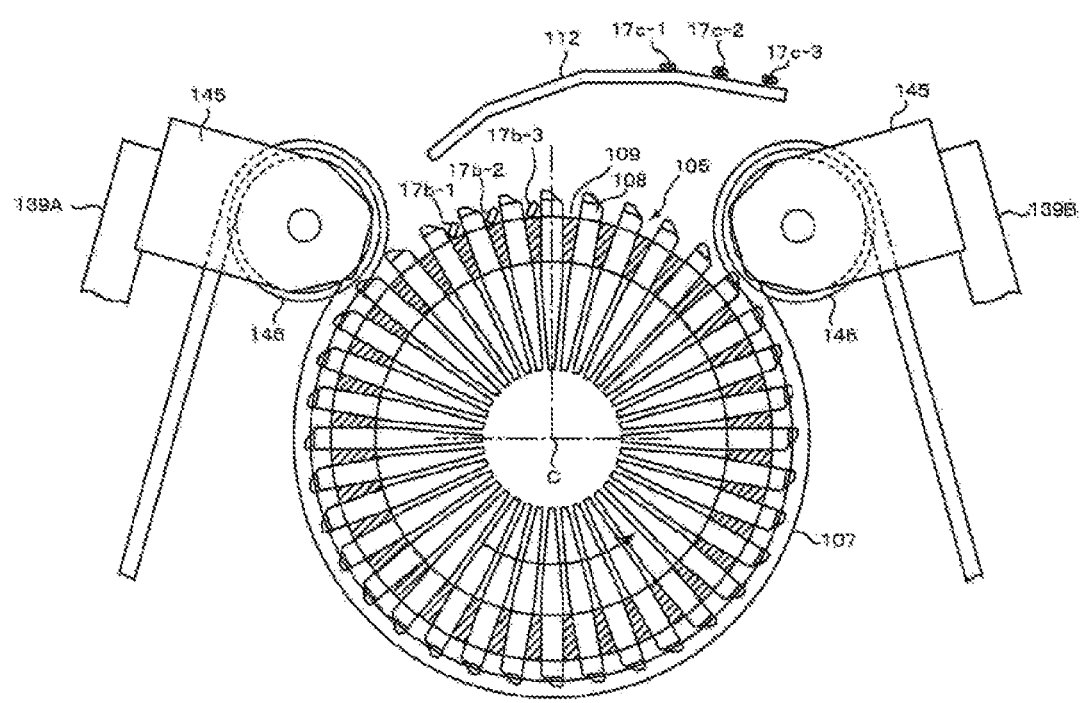
FIG. 2B is an essential part sectional view illustrating the state where front legs of first to third coil segments are inserted into the segment hold portions of the coil assembling apparatus in the first embodiment.
Figure 2C:
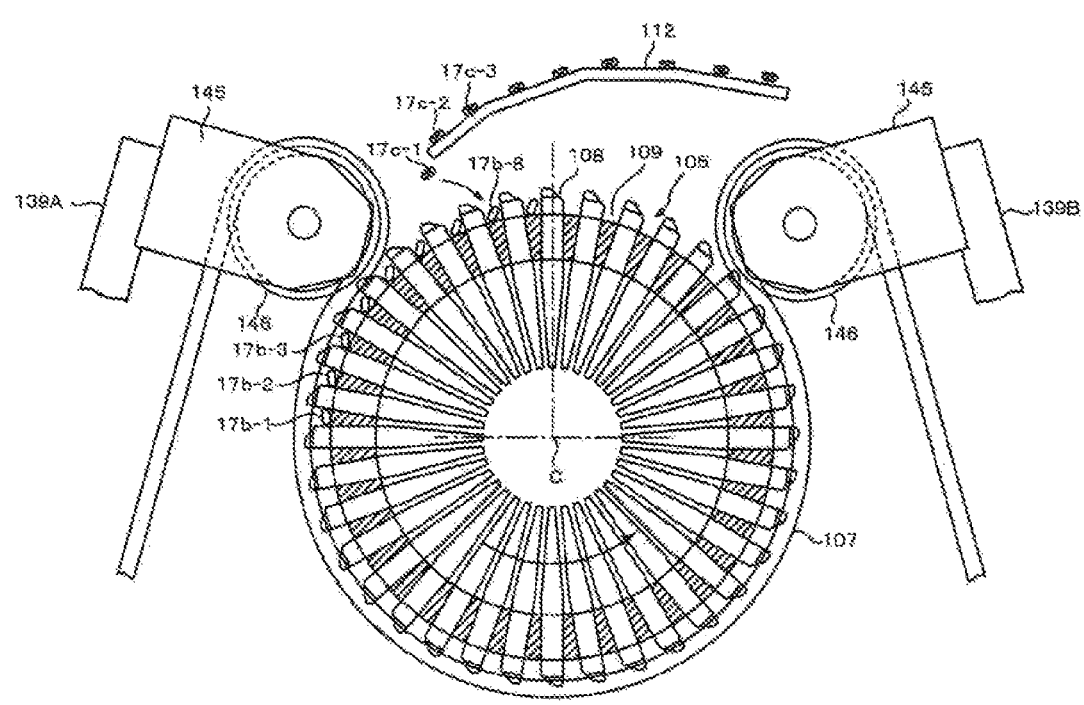
FIG. 2C is an essential part sectional view illustrating the state where a rear leg of the first coil segment is separated from a guide member and guided into the segment hold portion of the coil assembling apparatus in the first embodiment.
Figure 2D:
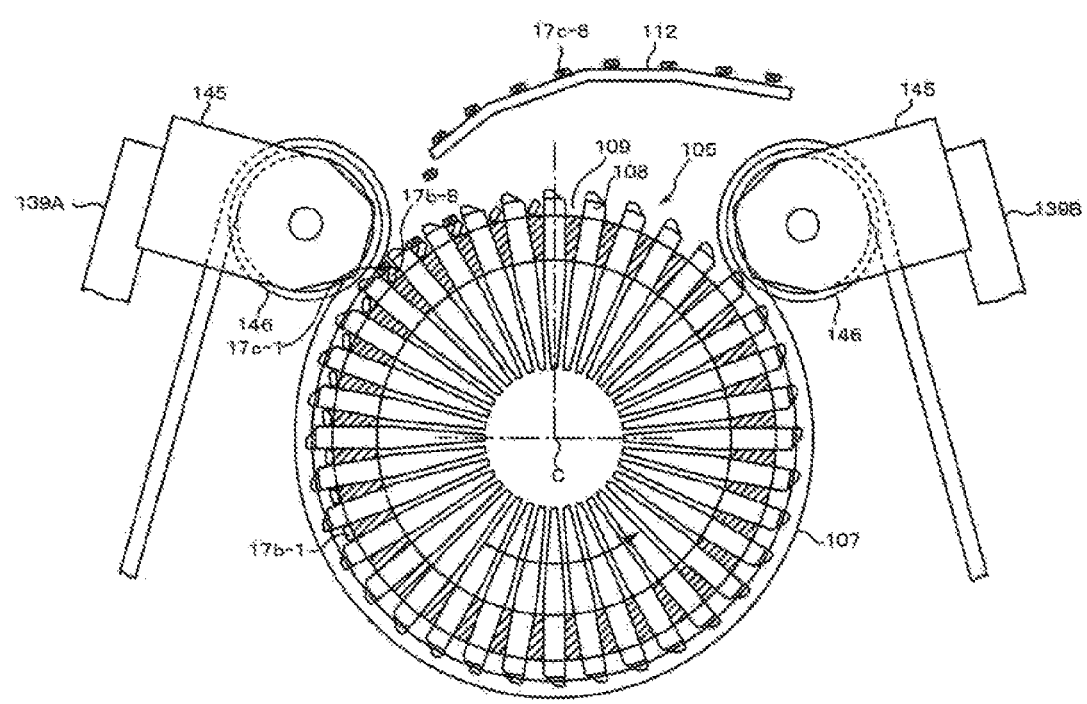
FIG. 2D is an essential part sectional view illustrating the state where the rear legs of the first to third coil segments are guided and inserted into the segment hold portions to ride on the front legs of the eight to ten coil segments, and a rear leg of the forth coil segment is separated from the guide member and guided into the segment hold portion, of the coil assembling apparatus in the first embodiment.
Figure 2E:
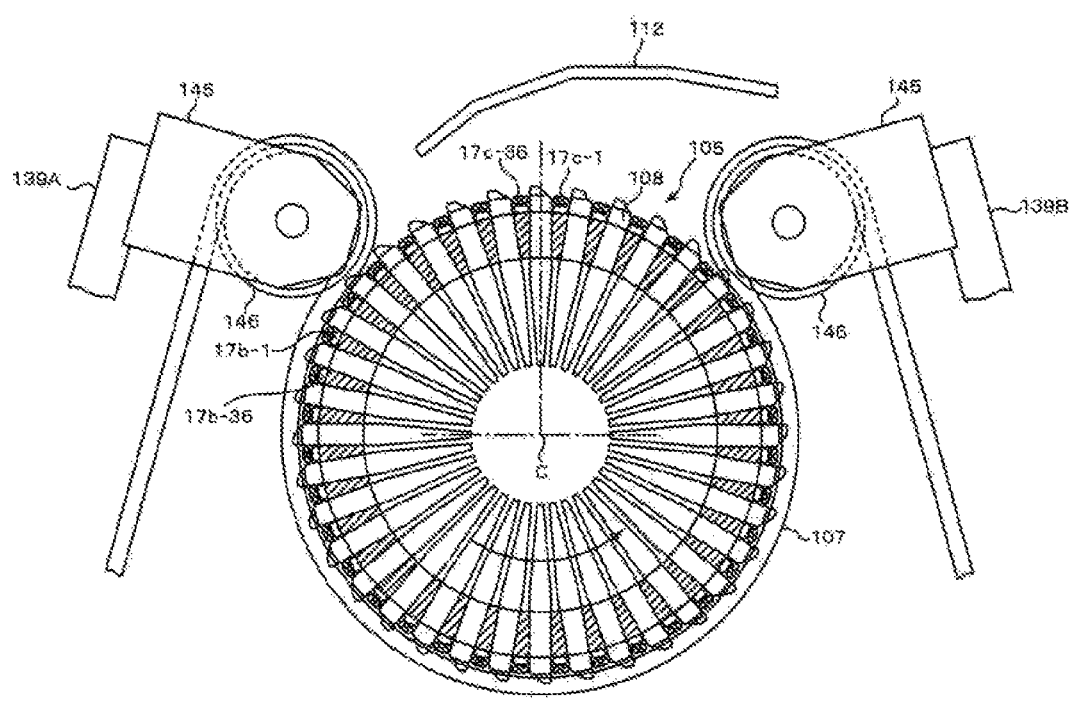
FIG. 2E is an essential part sectional view illustrating the state where the coil segments of a first loop are inserted into the segment hold portions of the coil assembling apparatus in the first embodiment.
Figure 2F:
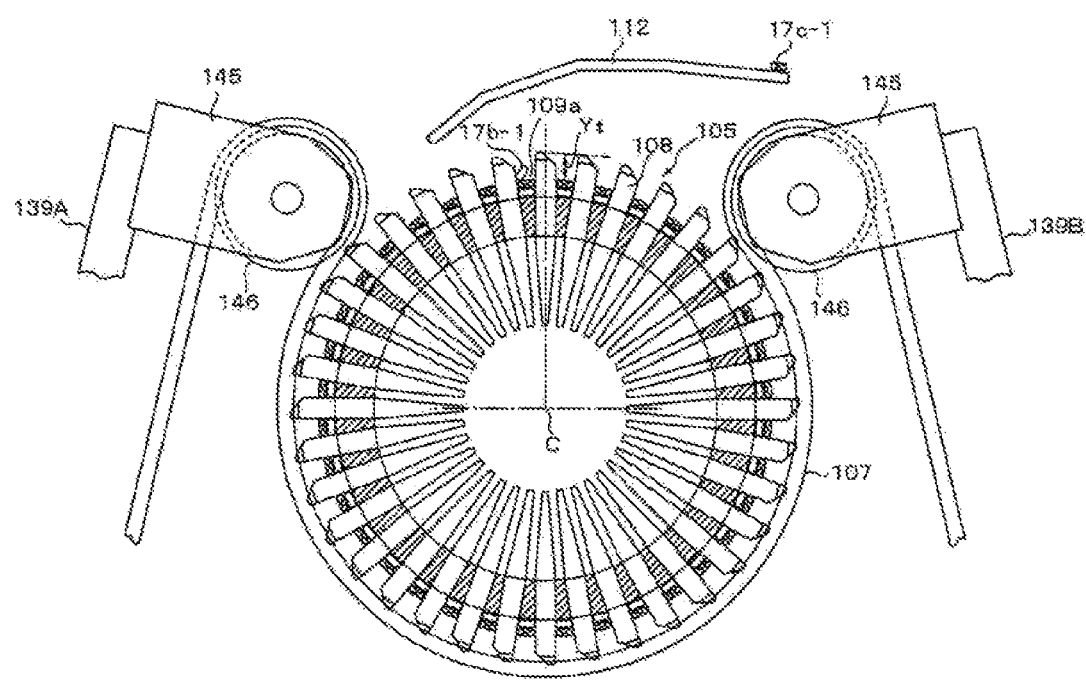
FIG. 2F is an essential part sectional view illustrating the state where the coil segments of the first loop are inserted into the segment hold portions and thereafter the front leg of the first coil segment of the second loop is inserted into the segment hold portion of the coil assembling apparatus in the first embodiment.
Figure 8:
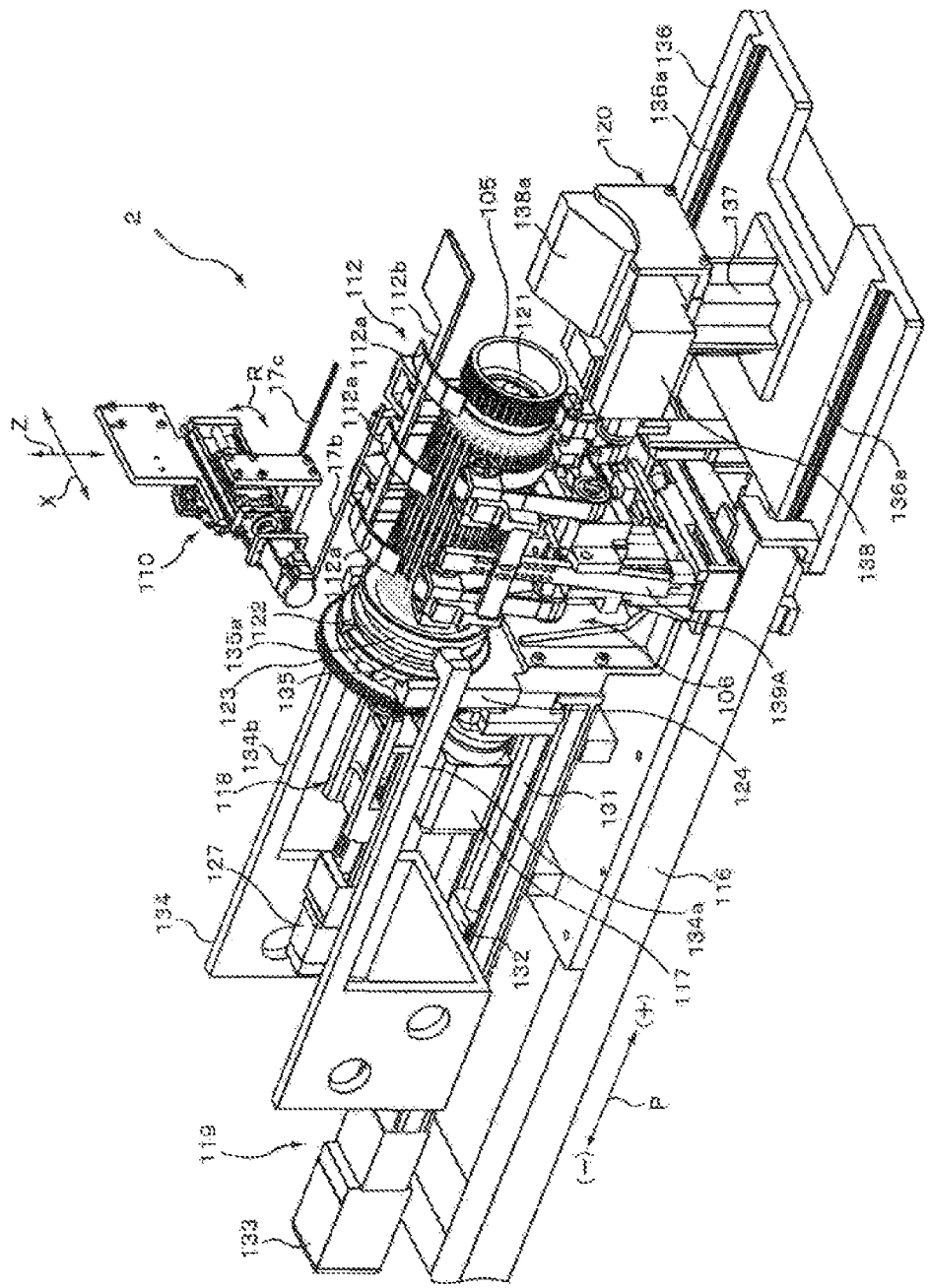
FIG. 8 is a perspective view schematically illustrating the whole constitution of the coil assembling apparatus in the first embodiment.

2A to FIG. 2F, and FIG. 8, and a guide member 112 (corresponding to the guide means according to the present invention) of a single stage (single layer) configuration for guiding to insert the plurality of coil segments 17S into the plurality of segment hold portions 109, respectively. The segment arrangement drum 105 is configured to rotate around the center axis C (rotation axis 121) at predetermined angle interval by means of an index-rotation drive mechanism (not shown). The guide member 112 is arranged above the segment arrangement drum 105. This guide member 112 is configured to guide and insert one slot insertion portion (front leg) 17b of the pair of slot insertion portions 17b and 17c of each coil segment 17S into one of the segment hold portions 109 each time the segment arrangement drum 105 rotates by a first predetermined angle, and configured to guide and insert the other one slot insertion portion (rear leg) 17c of the pair of slot insertion portions 17b and 17c into the other one of the segment hold portions 109 when the segment arrangement drum 105 rotates by a second predetermined angle from the insertion of the slot insertion portion 17b.

The coil assembling section 2 has a separation preventing means 106 for supporting the plurality of coil segments inserted into the plurality of segment hold portions 109 of the segment arrangement drum 105 so as to prevent separation of these plurality of coil segments from the plurality of segment hold portions 109, as shown in FIG. 2A to FIG. 2F and FIG. 8. The separation preventing means 106 has a belt 107 (corresponding to the belt body according to the present invention) made of a rubber, which is a flexible abutment member for performing abutment along the peripheral surface of the segment arrangement drum 105 and for performing co-rotation (driven-rotation) depending on the rotation of the segment arrangement drum 105. The belt 107 is formed to have a narrow width of about 3 cm and arranged in a loop shape to cover a part of the peripheral surface of the segment arrangement drum 105 at a plurality of points (two points in this embodiment) along the axis of the segment arrangement drum 105. It should be noted that the belt 107 is not arranged above the segment arrangement drum 105, to which the coil segments 17S are guided. Detail constitutions of the separation preventing means 106 will be described later.

The segment arrangement drum 105 is arranged so that the rotation center axis C thereof is horizontally-supported and that the plurality of segment hold portions 109 are also kept horizontal. This segment arrangement drum 105 is supported in this first embodiment in a state rotatable to the anticlockwise direction in FIG. 2A. In other words, the segment arrangement drum 105 is horizontally-arranged so that the center axis C of this drum 105 is substantially in parallel with an axis direction of the second bending-completed coil segment 17S in the second bending section 5 (insertion direction into the slot).

Inside of the segment arrangement drum 105, a plurality of blades 108, which are divisional walls extending in the axial direction of the drum 105, are annually arranged along the circumferential direction of the drum 105 and extended to the radial direction from the center axis C of the drum 105. Thus, the plurality of segment hold portions 109 are formed between the plurality of blades 108, respectively. Heights in the radial direction of the plurality of blades 108 are variable by sliding these blades along the radial direction. It is configured that the radial direction heights of these blades 108 corresponding to an outward projection amount in the radial direction of the segment arrangement drum 105 can be simultaneously adjusted for all of the blades 108.

Detail constitutions of this adjustment mechanism of the projection amount will be described later. The belt 107 of the separation preventing means 106 substantially abuts with the blades 108.

Figure 3:
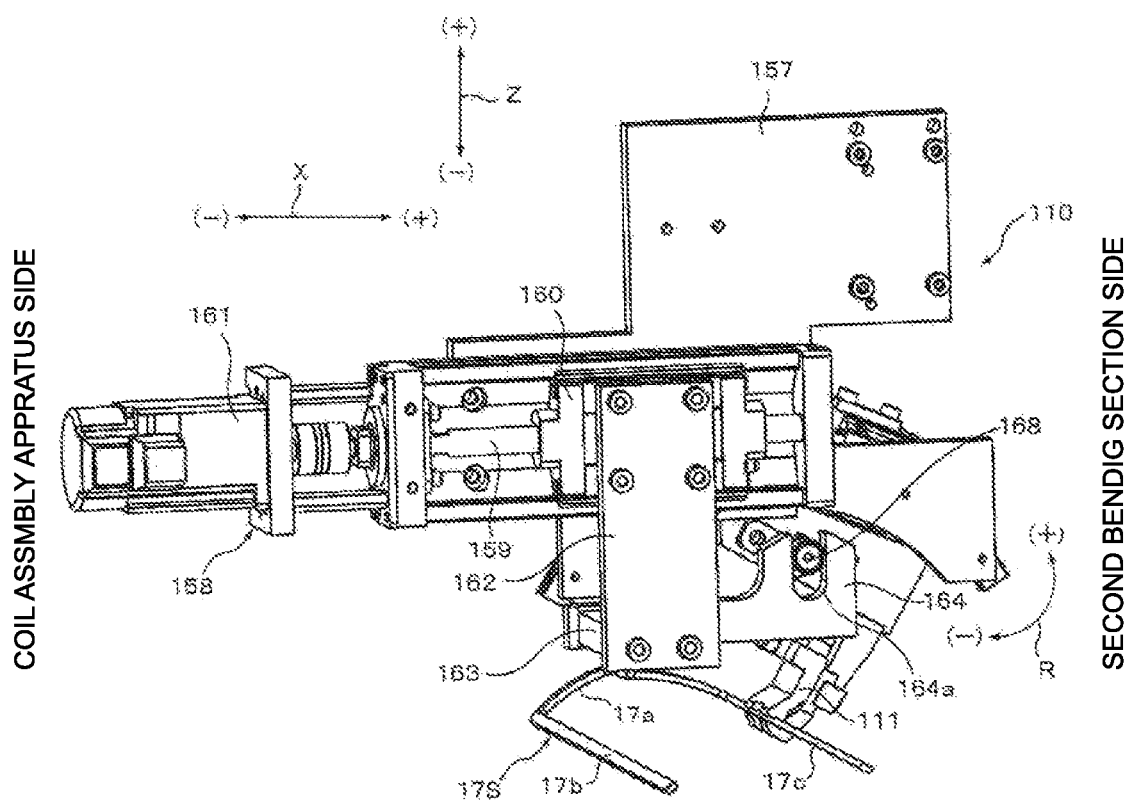
FIG. 3 is a perspective view schematically illustrating the constitution of a segment transport means of the coil assembling apparatus in the first embodiment.

The coil segment 17s, which is the second bending-completed coil segment in the second bending section 5, is parallel-transported by means of the segment transport means 110 from the second bending section 5 and guided and inserted into the segment hold portion 109 of the segment arrangement drum 105. As shown in FIG. 3, this segment transport means 110 has a chucking portion 111 for gripping one slot insertion portion 17c (rear leg) among the pair of insertion portions 17b and 17c of the coil segment 17S. Whole of the segment transport means 110 is movable in the upper and lower direction (Z(−) direction and Z(+) direction) and in the horizontal direction (X(−) direction and X(+) direction). The X(−) direction and the X(+) direction are directions along which the segment transport means 110 transports to and from, between the second bending section 5 and the segment arrangement drum 105. The chucking portion 111 is configured to rotate to the R direction in the vertical plane and to change its posture under the state where one slot insertion portion 17c (rear leg) of the coil segment 17S is gripped.

Figure 4:
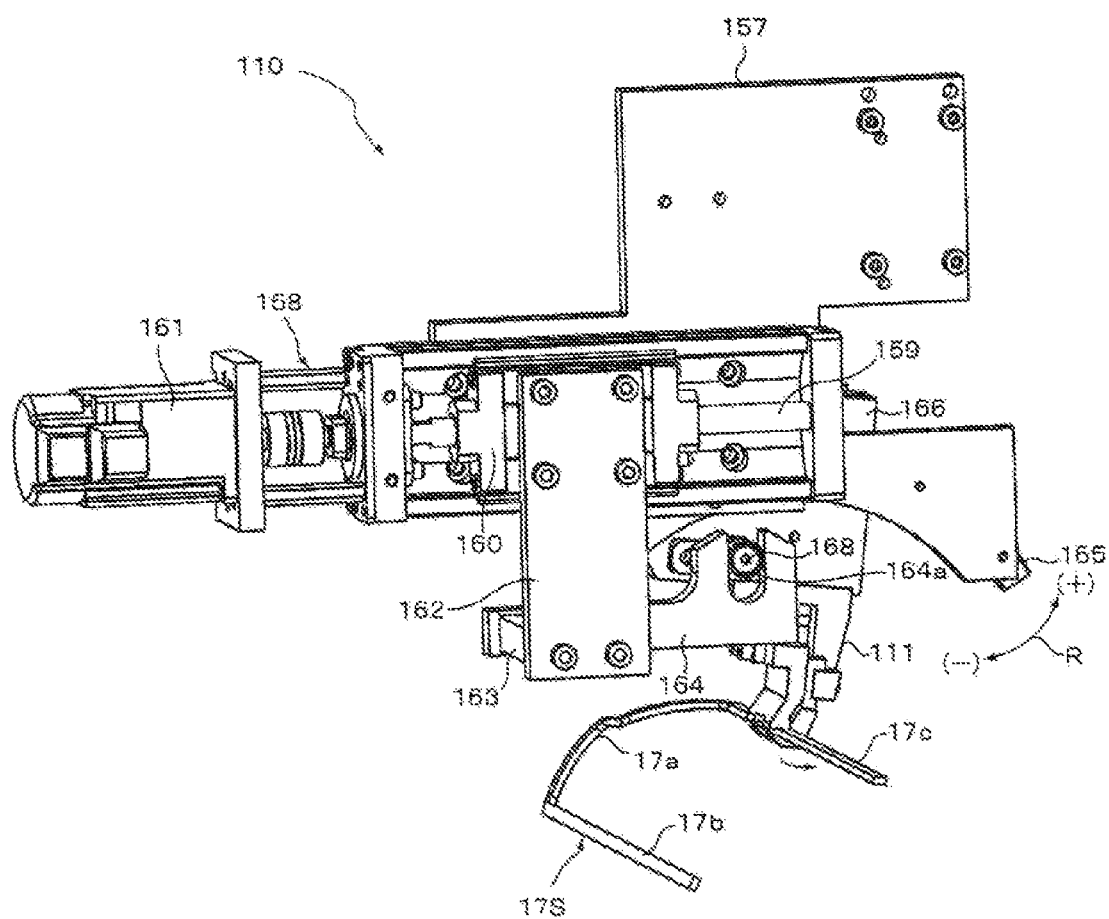
FIG. 4 is a perspective view schematically illustrating the state where a chuck portion of the segment transport means is rotated in the coil assembling apparatus in the first embodiment.

FIG. 3 indicates the state where the second bending of the coil segment 17S by the second bending section 5 has been completed, and then the bent coil segment 17S is gripped and transported by the segment transport means 110 after released from the press jigs. The chucking portion 111 of the segment transport means 110 grips the other slot insertion portion (rear leg) 17c of the coil segment 17S, which positions at the rear side when the coil segment is moved toward the coil assembling section side (segment arrangement drum 105 side). As shown in FIG. 4, before the coil segment 17S is transported to the segment arrangement drum 105, the chucking portion 111 of the segment transport means 110 rotates upward (R(+) direction) and thus the coil segment 17S inclines so that the one and front slot insertion portion (front leg) 17b positions obliquely downward.

In detail, the segment transport means 110 has, as shown in FIG. 3 and FIG. 4, abase 157 movable to the horizontal direction (X(−) direction and X(+) direction) and the vertical direction (upper and lower direction (Z(−) direction and Z(+) direction) by means of a drive mechanism not shown, the chucking portion 111 rotatably attached to the base 157, and a drive mechanism 158 for rotating the chuck portion 111 in the R(−) direction and R(+) direction. The drive mechanism. 158 has a ball screw portion 159 provided with a rotation axis parallel to the X(−) direction and X(+) direction, a nut portion 160 threadably mounted on the ball screw portion 159 and slidable in the X(−) direction and X(+) direction, a servomotor 161 for rotating the ball screw portion 159, and a slider 162 fixed to the nut portion 160 and moved in the X(−) direction and X(+) direction in response to the rotation of the ball screw portion 159.

Figure 5:
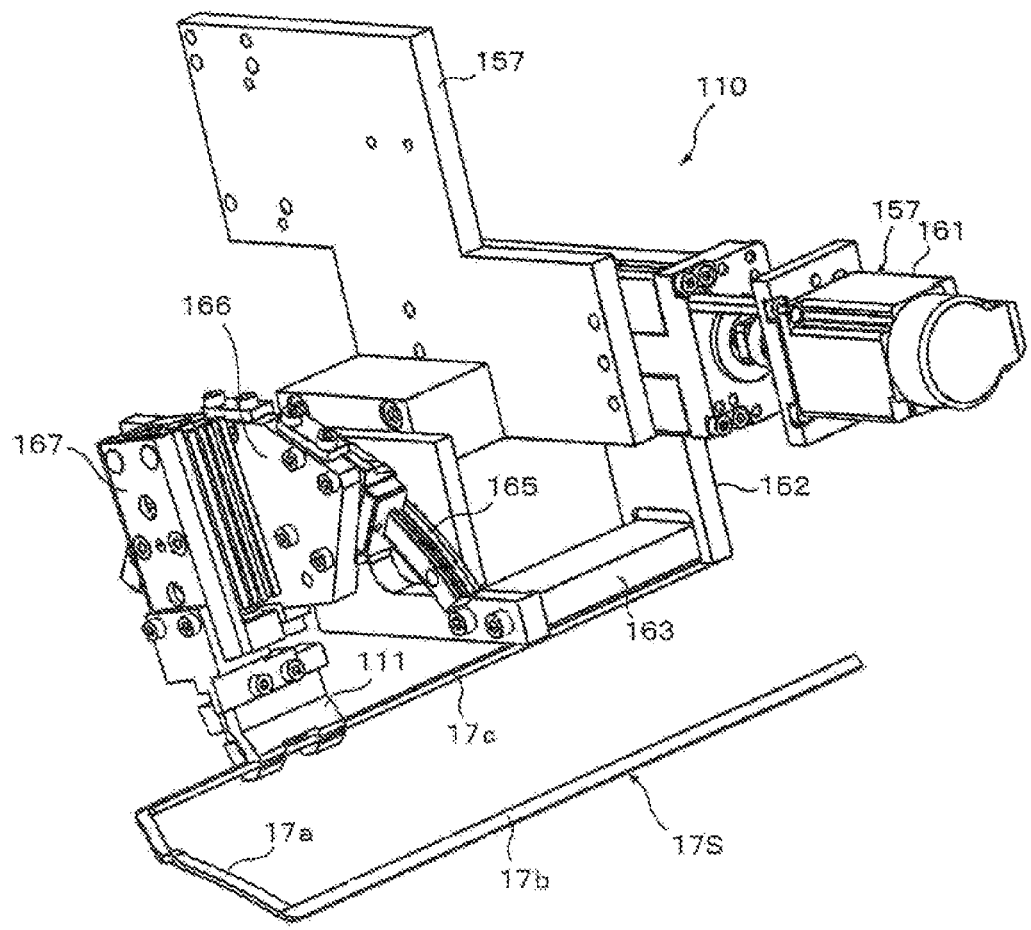
FIG. 5 is a perspective view schematically illustrating the constitution of the segment transport means seen from the backside in the coil assembling apparatus in the first embodiment.

The slider 162 has a rectangular shape extending to the upper and lower direction, and a drive pawl 164 is fixed to the rear surface of the lower portion of the slider 162 through a bracket 163. As shown in FIG. 5, a rail 165 with a circular arc shape is fixed to the rear surface side of the base 157, and the chuck portion 111 is supported by a turning base 166 fitted to this rail 165 and turned along the rail 165. An air cylinder for opening and closing the chucking portion 111 is formed in the turning base 166. As shown in FIG. 3 and FIG. 4, a cam follower 168 is formed on the front surface side of the turning base 166 and a concave groove 164a engaged with the cam follower 168 is formed in the drive pawl 164.

When the servomotor 161 of the drive mechanism 158 operates to move the slider 162 to the X(−) direction, the chuck portion 11 rotates to the R(−) direction. If the slider 162 moves to the X(+) direction, the chuck portion 11 rotates to the R(+) direction. Thus, by controlling the operations of the servomotor 161, it is possible to change the inclination of the coil segment 17S.

Figure 6:
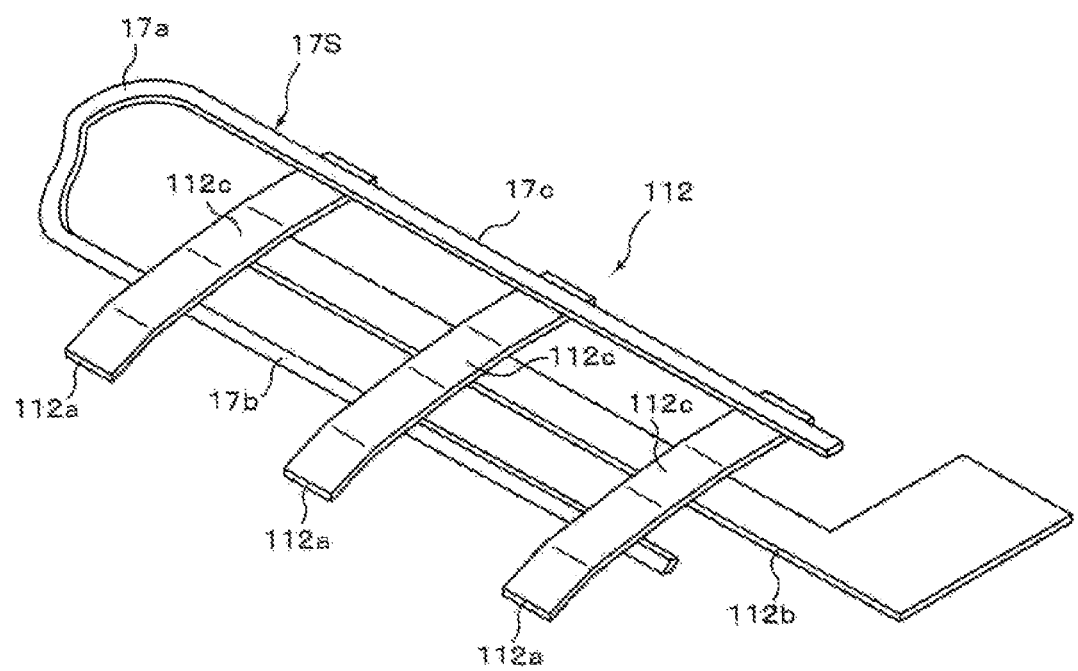
FIG. 6 is a perspective view schematically illustrating a guide member and a coil segment guided by the guide member of the coil assembling apparatus in the first embodiment.

As shown in FIG. 2A, a guide member 112 supported by a frame (not shown) is formed above the segment arrangement drum 105. This guide member 112 has a guide surface 112c formed along the peripheral surface of the segment arrangement drum 105 and guides the coil segment 17S into the predetermined segment hold portion 109 of the segment arrangement drum 105. The guide member 112, as shown in FIG. 8, extends along the axial direction of the segment arrangement drum 105, and arranged to oppose with a space to the peripheral surface of the segment arrangement drum 105. The guide member 112 has, as shown in FIG. 6, a plurality (three in this embodiment) of guide pieces 112a with a small width, and a bracket 112b for supporting these guide pieces 112a away from each other. The bracket 112b is formed along the axial direction of the segment arrangement drum 105, and the guide pieces 112a extend to the direction perpendicular to the bracket 112b. The bracket 112b is fixed to the frame (not shown) as aforementioned.

The coil segment 17S is transported so that the front leg 17b of the coil segment 17S passes under the guide member 112 (between the guide member 112 and the segment arrangement drum 105) and the rear leg 17c of the coil segment 17S passes above the guide member 112 (above the opposite side of the guide member 112 with respect to the segment arrangement drum 105) under the conditions where the front leg 17b of the coil segment is gripped by the chuck portion 111 of the segment transport means 110 as shown in FIG. 6. As shown in FIG. 2A, the segment transport means 110 starts to lower when the front leg 17b of the coil segment 17S reaches a position above the segment hold portion 109a, which position is the reference point. Although the reference point of this first embodiment is set to the segment hold portion 109a between the blade 108 located at the upper center of the segment arrangement drum 105 and the blade 108 adjacent to this upper center blade downstream of the rotation direction of the segment arrangement drum 105, the reference point of the present invention is not limited to this position. When the segment transport means 110 lowers and thereby a detection sensor 170 arranged on the lower surface of the guide member 112 detects the insertion of the front leg 17b of the coil segment 17S into the segment hold portion 109a, the chuck portion 111 of the segment transport means 110 releases the coil segment 17S. Thus, the rear leg 17c of the coil segment 17S is laid on the guide member 112.

When the insertion of the front leg 17b of the coil segment 17S into the segment hold portion 109a is detected, the segment arrangement drum 105 is controlled to rotate to the counterclockwise direction in the figure by a first predetermined angle corresponding to one slot, that is the first predetermined angle corresponding to an angle of one segment hold portion 109 (index rotation). Since the front leg 17b of the coil segment 17S is accommodated and caught in the segment hold portion 109, in case that the segment arrangement drum 105 rotates, the rear leg 17c of the coil segment 17S moves in a state of sliding on a guide surface 112c. When the segment arrangement drum 105 rotates by an angle corresponding to one slot, the segment hold portion 109b located upstream in the rotation direction, of and adjacent to the segment hold portion 109a that is a first reference point becomes a next reference point of the coil segment 17S. In order that the front leg 17b is smoothly inserted into the segment hold portion 109 that is the reference point, the upstream part in the rotation direction of the segment arrangement drum 105, of each blade 108 is chamfered to form a tapered surface 108b. It should be noted that, in this first embodiment, since there is 36 slots in one circuit of the segment arrangement drum 105, the angle corresponding to one slot of the segment arrangement drum 105, namely the first predetermined angle is 10 degrees.

Figure 7:
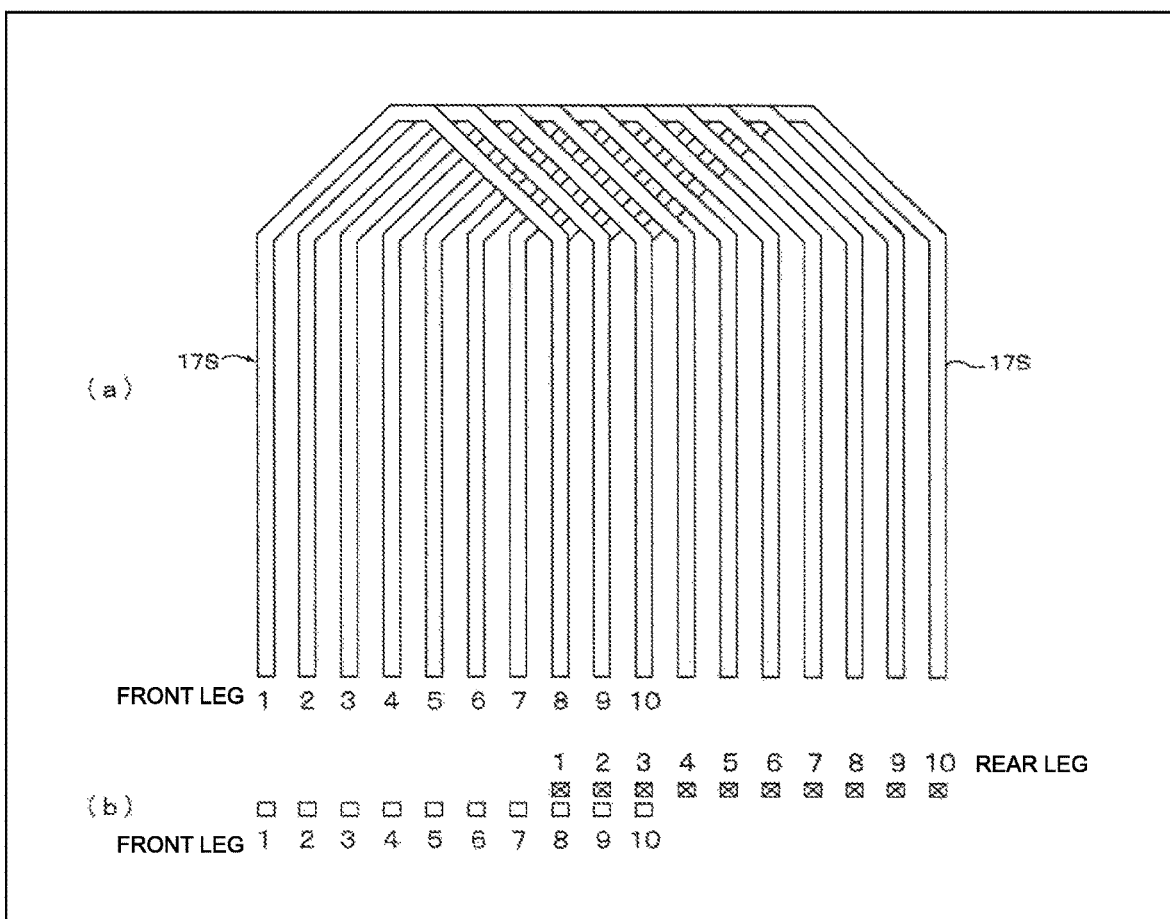
FIG. 7 is a developed view illustrating assembling order of one kind of coil segments assembled in the coil assembling apparatus in the first embodiment.

Hereinafter, operations of sequentially inserting the plurality of coil segments 17S into the plurality of segment hold portions 109 of the segment arrangement drum 105 respectively will be described. It should be noted that in the figure the coil segments 17S is represented only by the end surfaces of the front legs and the rear legs. In FIG. 7, the front leg is indicated by an outline with white space and the rear leg is indicated by an outline with X.

FIG. 2B shows the state where the front legs 17b of the three coil segments 17S are inserted in the segment hold portions 109 of the segment arrangement drum 105, respectively, and the rear legs 17c are laid on the guide surface 112. In FIG. 2B, reference numerals 17b-1, 17b-2 and 17b-3 indicate the first, second and third front legs of the coil segment 17S, respectively, and reference numerals 17c-1, 17c-2 and 17c-3 indicate the first, second and third rear legs of the coil segment 17S, respectively.

FIG. 2C shows the state where the rear leg 17c-1 of the first coil segment 17S drops apart from the guide member 112. When the rear leg 17c-1 leaves from the guide member 112, the coil segment 17S rotates by the gravity around its front leg 17b-1 inserted in the segment hold portion 109 of the segment arrangement drum 105 as a fulcrum point, and thus the rear leg 17c-1 is automatically inserted into the segment hold portion 109 by its own weight. In this first embodiment, since the coil segment 17S has a predetermined width, the rear leg 17c-1 will be inserted into the eighth segment hold portion 109 in the upstream rotation direction of the segment arrangement drum 105 from the segment hold portion 109 into which the front leg 17b-1 is inserted. In other words, when the segment arrangement drum 105 rotates by a second predetermined angle corresponding to 8 slots, namely when the segment arrangement drum 105 rotates by the second predetermined angle corresponding to 8 segment hold portions 109, the rear leg 17c-1 is inserted into the segment hold portion 109. A relative angle of the front leg inserted in the segment hold portion 109 with respect to the peripheral surface of the segment arrangement drum 105 is reduced depending upon the progress of the index rotation of the segment arrangement drum 105, that is, attitude of the front leg with respect to the peripheral surface of the segment arrangement drum 105 is inclined to close in parallel with the peripheral surface. In this first embodiment, since there is 36 slots in one circuit, an angle of the eight slots of the segment arrangement drum 105, that is the second predetermined angle, is 80 degrees. It should be noted however that this second predetermined angle differs depending on the coil width of the coil segment.

FIG. 2D shows the state where the rear legs of the first to third coil segments 17S are guided and inserted in the segment hold portions to lay on the front legs of the eighth to tenth coil segments 17S, respectively, and the rear leg of the fourth coil segment 17S is left from the guide member 112. As will be seen in FIG. 2D, the rear leg 17c-1 of the first coil segment 17S is inserted and laid on the front leg 17b-8 of the eighth coil segment 17S for example. This operation is enabled because the coil segment 17s after the second bending has a shape capable of performing so-called lane change. That is, as shown in FIG. 2A, the coil segment 17S has the step 17a-1 formed on the linking portion 17a for deviating the rear leg 17c-1 to the radial outward direction of the segment arrangement drum 105. Therefore, the front leg 17b-1 of the first coil segment 17S is arranged in a first layer of the coil and the rear leg 17c-1 of this first coil segment 17S is arranged in a second layer of the coil.

When the insertion and arrangement operations of the rear legs of all the coil segments 17S with respect to the first round by performing the similar operations, arrangement of the two layers of the coil segments 17S is completed as shown in FIG. 2E. After the completion of the first round arrangement of all the coil segments 17S, insertion and arrangement operations of the second round coil segments 17S is started from its first segment as shown in FIG. 2F. Before the start of the insertion and arrangement operations of the second round coil segments 17S, each blade 108 is protruded to the radial outward direction from the segment arrangement drum 105. The protruded amount of the blade 108 is set to a height larger than the total thicknesses of the coil segments already inserted. A tolerance (height Yt) of the protruded amount of the blade 108 with respect to the total thicknesses of the coil segments inserted is within a range whereby the front leg and the rear leg of the coil segment 17S can be stably inserted and arranged and also additional insertion of new coil segment cannot be blocked, namely 4 mm for example.

When the protruding operation of the blade 108 is completed, the first front leg 17b-1 of the second round coil segment 17S is inserted into the segment hold portion 109a at the reference point, and the rear leg 17c-1 is laid on the guide member 112. Thereafter, the coil segments 17S are inserted and arranged as well as that in the first round, and when the segment arrangement drum 105 rotates one revolution, the insertion and arrangement operations of the coil segments of the second round are completed to form the four layers of the arranged coil segments 17S. If the protruded amount of the blade 108 is set to a height corresponding to the objective thickness of the layers from a beginning, the segment hold portion will become too deep causing smooth insertion operations to be blocked. Thus, the blade 108 is protruded in a stepwise fashion depending upon the thickness of the layers. Because the diameter of the peripheral surface of the segment arrangement drum 105 changes when the number of the layers is increased, an adjustment to keep the abutment pressure of the belt 107 to the blade 108 constant is performed in response to the protruding operation of the blade 108 as described later.

In the aforementioned first embodiment, the coil segments supplied to the coil assembling section 2 are disposed to sequentially arrange in the same pattern the coil segments 17S with basically the same shape as shown in FIG. 7. That is, the rear legs of the first to third coil segments are laid on the front legs of the eighth to tenth coil segments, respectively when the ten coil segments are simply arranged and spread.

According to this first embodiment, as aforementioned, the coil segments 17S to be formed, which were bent in the predetermined shape, are transported above the horizontally disposed segment arrangement drum 105 with keeping the horizontal state that is the state in the bending operation, and continuously inserted into the segment hold portion by rotating the segment arrangement drum 105 with each predetermined angle. Since the segment arrangement drum 105 is horizontally disposed and the coil segments 17S are guided from above the segment arrangement drum 105, if only the front leg of the coil segment 17S is guided to be inserted into the segment hold portion of the segment arrangement drum 105, the rear leg thereof will be automatically inserted into the segment hold portion by its own weight. Therefore, according to this embodiment, automation of the assembling process can be easier than that in the conventional apparatus, and a coil can be quickly and efficiently assembled.

Next, concrete constitution of the coil assembling section 2 in this first embodiment will be described in detail with reference to FIG. 3 to FIG. 6 and FIG. 8 to FIG. 12.

Figure 9:
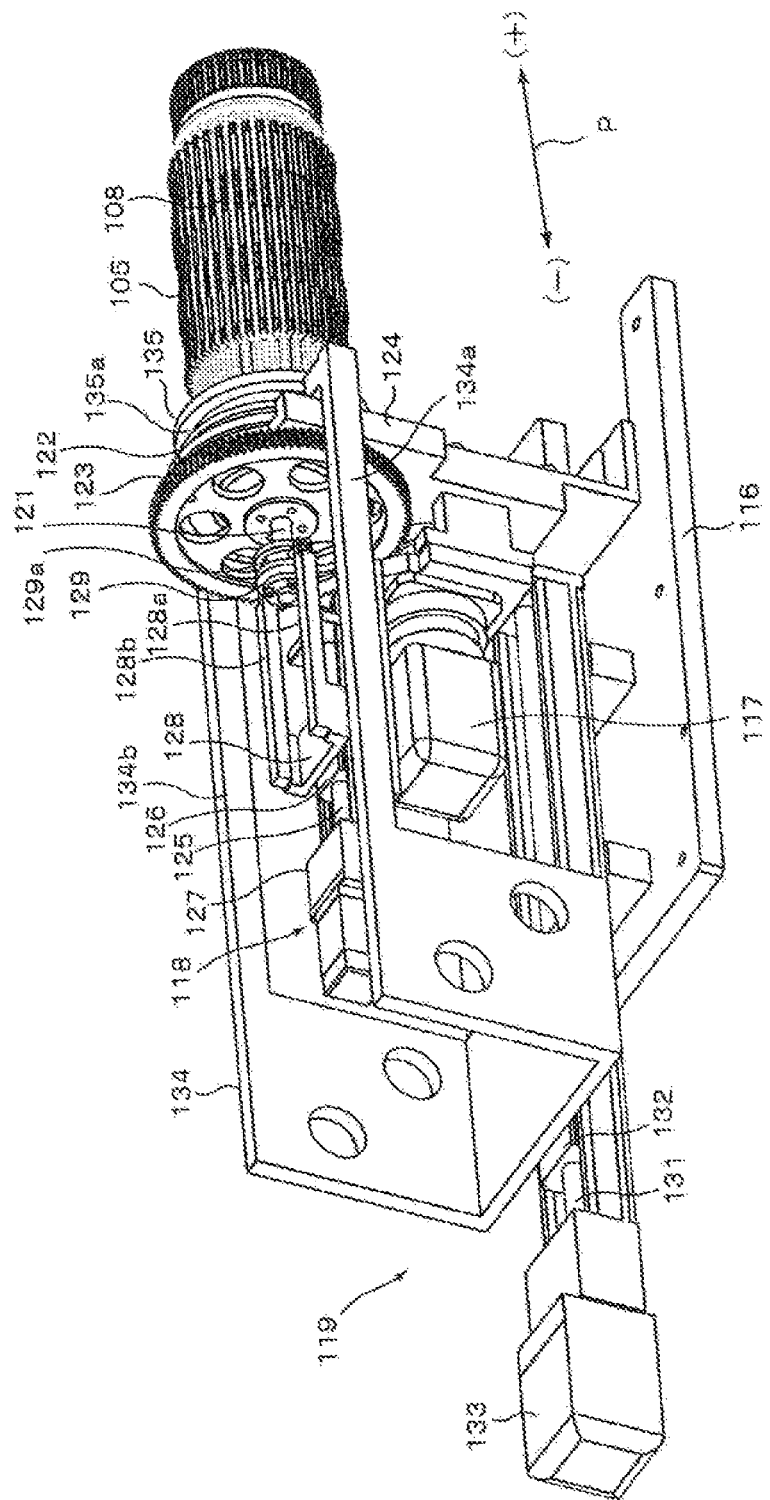
FIG. 9 is a perspective view schematically illustrating the constitution of a push-out mechanism and a blade adjustment mechanism of the coil assembling apparatus in the first embodiment.

As shown in FIGS. 8 and 9, the coil assembling section 2 has abase 116, the segment arrangement drum 105 rotatably supported by and arranged on the base 116 so that the rotation axis 121 of the drum 105, which is a center axis C of rotation, is horizontally retained, the separation preventing means 106 provided with the belt 107, a servomotor 117 that is a drive source for rotationally driving the segment arrangement drum 105, a blade adjustment mechanism 118 for changing the protruded amount of the blade 108, a push-out mechanism 119 for pushing out, in the axial direction of the segment arrangement drum 105, an assembled coil consisting of the predetermined number (36 in the first embodiment) of coil segments inserted and held in the respective segment hold portions 109 annularly arranged in the segment arrangement drum 105, a work support base 120 arranged on the opposite side of the push-out mechanism 119 with respect to the segment arrangement drum 105, the aforementioned segment transport means 110, and a guide member 112 constituted in a single stage (single layer).

The segment arrangement drum 105 is supported so as to be rotatable around the rotation axis 121 as a center of rotation. A disk-shaped bearing 122 for supporting the rotation axis 121 is arranged on the opposite side of the assembled coil push-out direction (P(+) direction) of this segment arrangement drum 105, and a large diameter gear 123 is coaxially fixed to the rotation axis 121. A small diameter gear (not shown) fixed to a rotation axis of the servomotor 117 is meshed with this large diameter gear 123. Thus, when the servomotor 117 rotates, the segment arrangement drum 105 is rotationally driven via the rotation axis, the small diameter gear and the large diameter gear 123. Due to the speed-reduction gear mechanism of these meshed small diameter gear and large diameter gear 123, it is possible to improve the precision of the index rotation of the segment arrangement drum 105 driven by the servomotor 117.

The bearing 122 is supported by a receiving portion 124 having a bottom fixed to the base 116, and thereby the segment arrangement drum 105 is cantilever-supported. Since portions of the segment arrangement drum 105, for arranging the coil segments 17S are held by the separation preventing means 106 as aforementioned, it is possible to stably rotate this segment arrangement drum 105. An index rotation mechanism for rotating the segment arrangement drum 105 by a predetermined angle (first predetermined angle) every time when the front leg 17b of the coil segment 17S is arranged is configured by the servomotor 117, the rotation axis of the servomotor 117, the small diameter gear fixed to this rotation axis, the large diameter gear 123 meshed with this small diameter gear, and a control unit 49 that will be mentioned later for controlling the servomotor 117.

Figure 10:
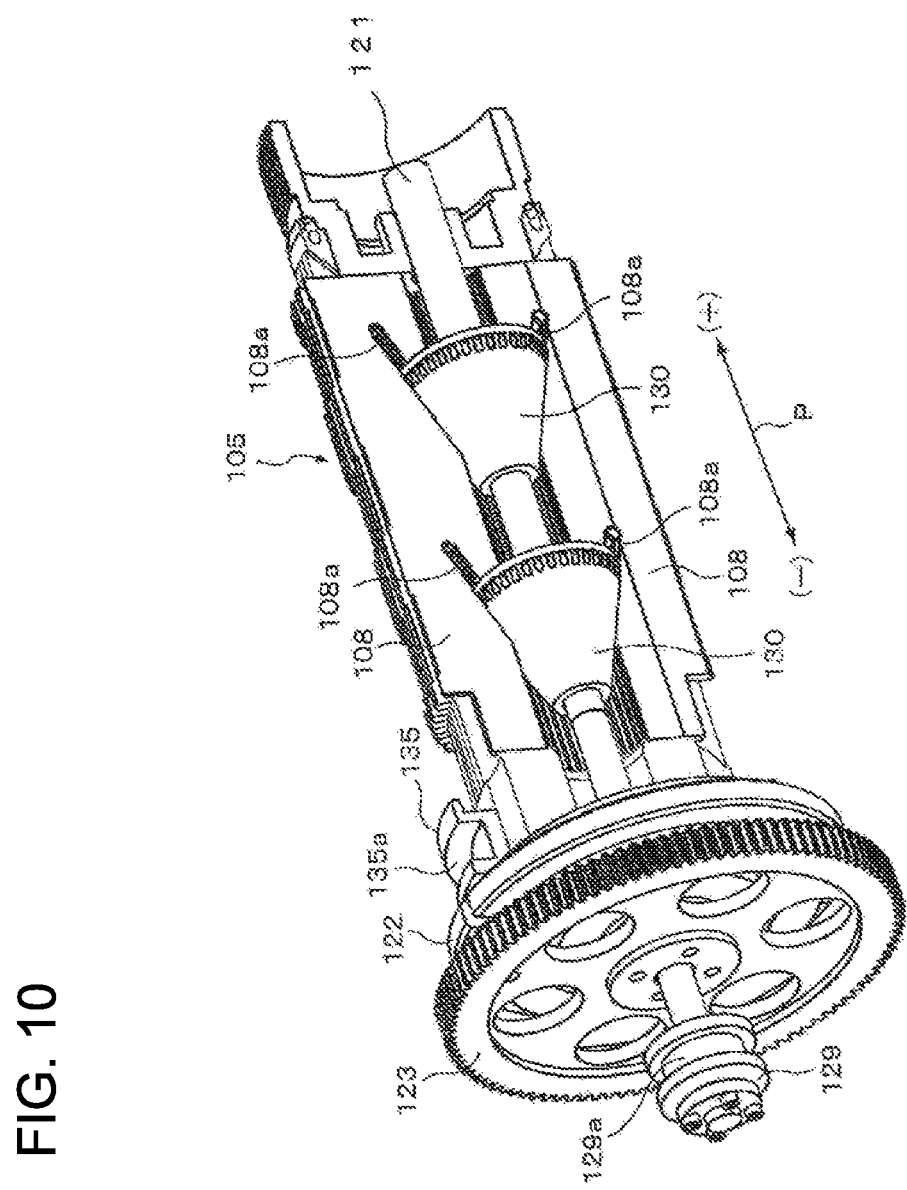
FIG. 10 is a partially exploded perspective view schematically illustrating a partial constitution of the blade adjustment mechanism of the coil assembling apparatus in the first embodiment.

As shown in FIGS. 9 and 10, the blade adjustment mechanism 118 has a ball screw portion 125 provided with a rotation axis that is parallel to the rotation axis 121 of the segment arrangement drum 105, a nut portion 126 meshed with this ball screw portion 125 and slidable in P(−) and P(+) directions parallel to the rotation axis, a servomotor 127 for rotationally driving the ball screw portion 125, a slide member 128 provided with a base portion fixed to the nut portion 126, for sliding in P(−) and P(+) directions in response to the rotation of the ball screw portion 125, an engagement portion 129 fixed to the rotation axis 121, for engaging with a convex top end portion of the slide member 128, and a plurality of (two in the example shown) hollow conical cams 130 (FIG. 10) located inside of the segment arrangement drum 105 and fixed to the rotation axis 121.

The slide member 128 has a base portion fixed to the nut portion 126, and a pair of arms 128a and 128b parallel to each other and extended along the ball screw portion 125 from this base portion. A pair of convex portions protruded to the inside are formed at the top of the pair of arms 128a and 128b, respectively. The pair of convex portions 129 engage in cam follower manner with an annular groove 129a of the engagement portion 129. Thus, the slide member 128 and the engagement portion 129 are being coupled with a low friction even when both the rotation axis 121 and the engagement portion 129 rotate. As a result, when the servomotor 127 and the ball screw portion 125 rotate and thus the nut portion 126 and the slide member 128 slide along the ball screw portion 125, the rotation axis 121 moves to the sliding direction depending on the sliding.

As shown in FIG. 10, a groove 108a obliquely extended is formed on each of the blades 108 of the segment arrangement drum 105, and the conical cam 130 is inserted slidably in the groove 108a. Thus, when the servomotor 127 rotates and the rotation axis 121 moves to the P(−) direction, the blade 108 projects towards the radial outward direction of the segment arrangement drum 105. When the rotation axis 121 moves to the P(+) direction, the blade 108 will be drawn towards the radial inward direction of the segment arrangement drum 105. The protruded amount of the blade 108 can be adjusted by thus controlling the rotation amount and the rotation direction of the servomotor 127.

The push-out mechanism 119 has, as shown in FIG. 8, a ball screw portion 131 provided with a rotation axis that is parallel to the rotation axis 121 of the segment arrangement drum 105, a nut portion 132 meshed with this ball screw portion 131 and slidable in P(−) and P(+) directions parallel to the rotation axis, a servomotor 133 for rotationally driving the ball screw portion 131, a slide member 134 fixed to the nut portion 132, for sliding in P(−) and P(+) directions in response to the rotation of the ball screw portion 131, and a press ring 135 arranged on the peripheral surface of the segment arrangement drum 105 and slidable in the axial direction (P(−) and P(+) directions), for engaging with the slide member 134.

The slide member 134 has a base portion fixed to the nut portion 132, and a pair of arms 134a and 134b parallel to each other and extended along the ball screw portion 131 from this base portion. A pair of convex portions protruded to the inside are formed at the top of the pair of arms 134a and 134b, respectively. The pair of convex portions engage in cam follower manner with an annular groove 135a of the press ring 135. Thus, the slide member 134 and the press ring 135 are being coupled with a low friction even when the press ring 135 rotates due to the friction between the peripheral surface of the segment arrangement drum 105 and the press ring 135. As a result, when the servomotor 133 and the ball screw portion 131 rotate and thus the nut portion 132 and the slide member 134 slide along the ball screw portion 131, the segment arrangement drum 105 moves to the sliding direction depending on the sliding.

The work support base 120 has a base portion 136, a work carrying portion 138 provided with a V-shaped concave portion 138a fixed to the base portion 136 via a column 137, and a pair of rails 136a formed at both sides on the top surface of the base portion 136.

Figure 11:
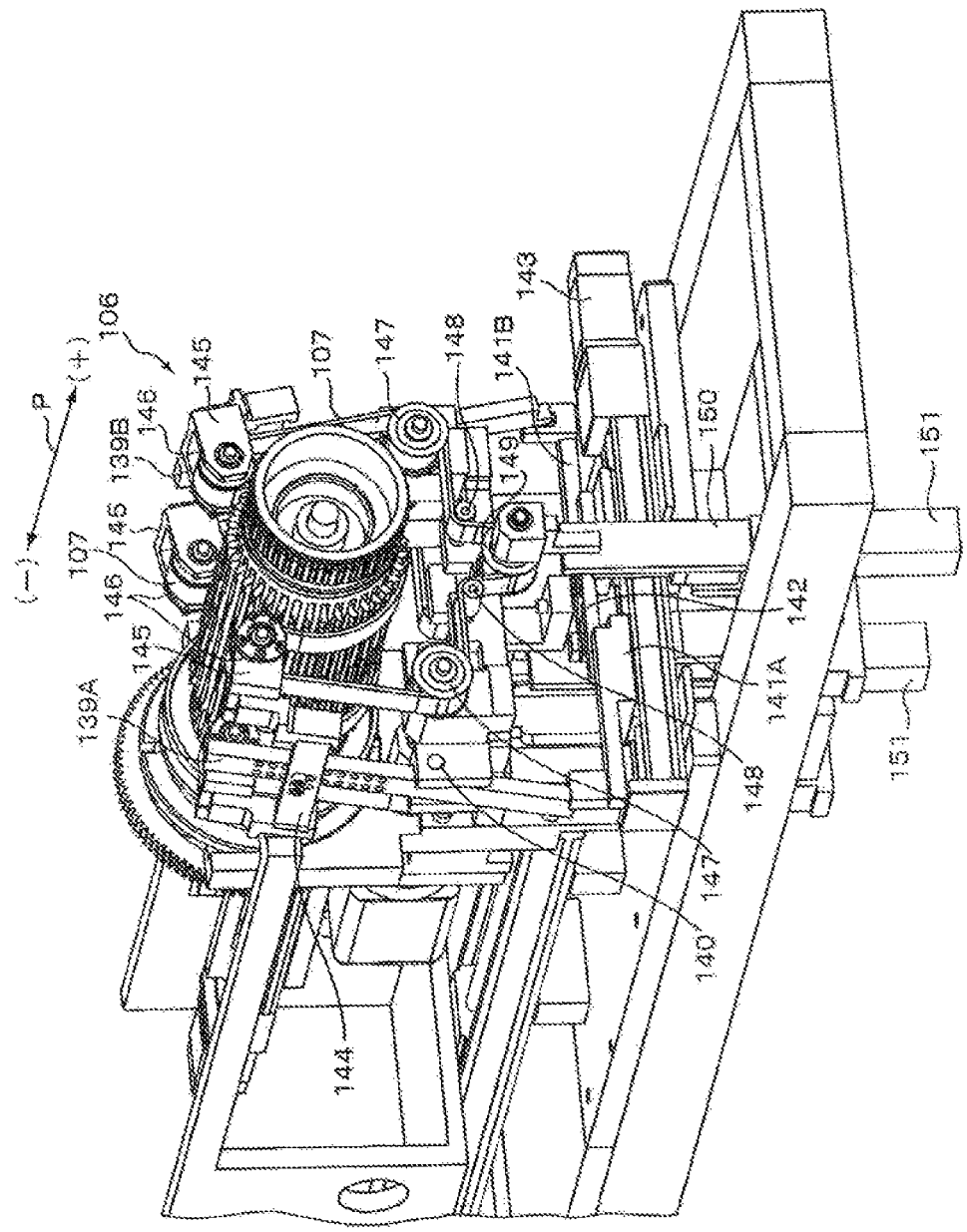
FIG. 11 is a schematic perspective diagram illustrating a separation preventing means of the coil assembling apparatus in the first embodiment.
Figure 12:
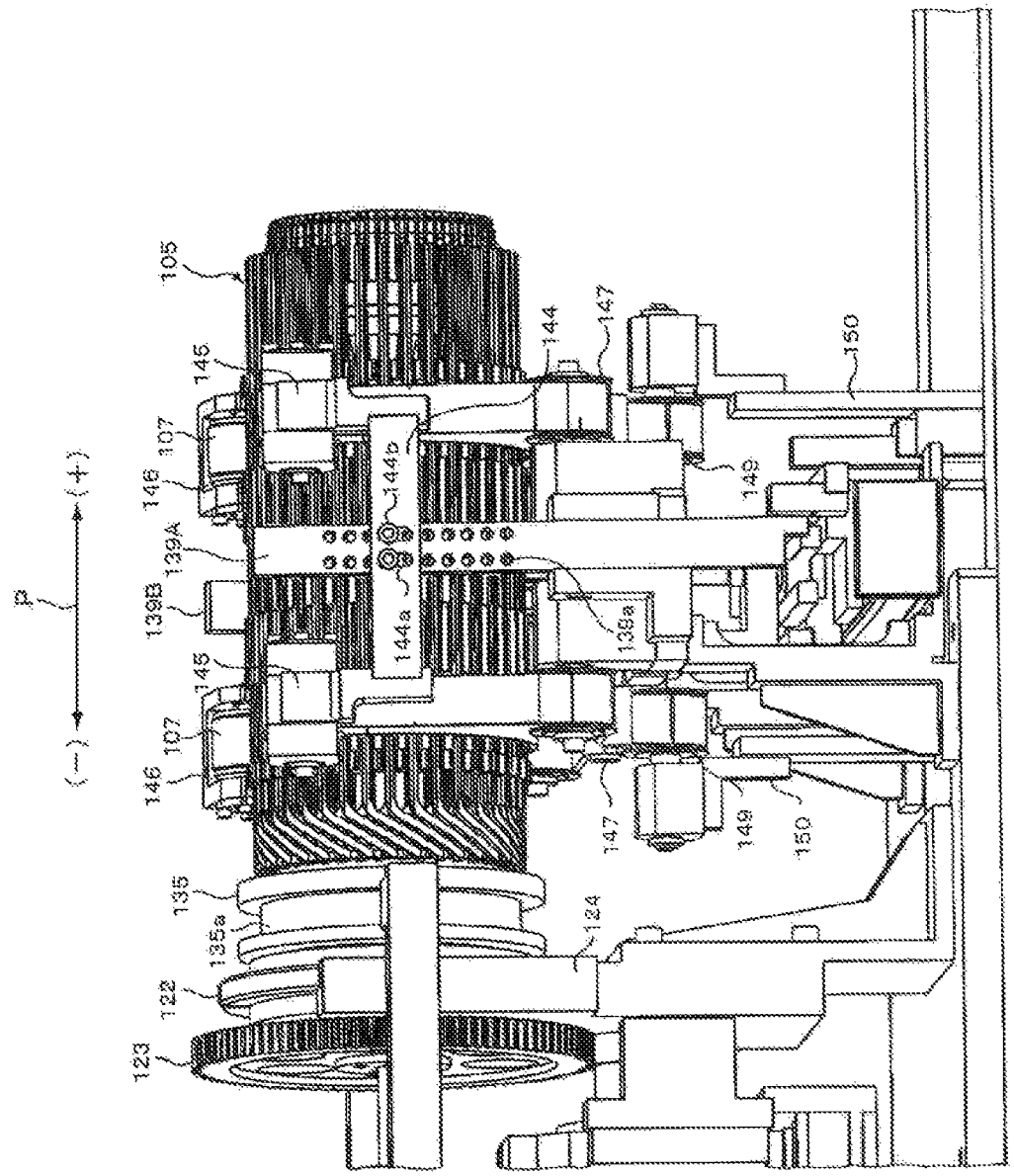
FIG. 12 is a perspective view schematically illustrating the constitution of the separation preventing means of the coil assembling apparatus in the first embodiment.

The separation preventing means 106 has, as shown in FIGS. 11 and 12, a pair of arms 139A and 139B extended to upper and lower direction and arranged on the radial side of the segment arrangement drum 105 on the opposite side with each other with respect to this segment arrangement drum 105. The pair of arms 139A and 139B are rotatably supported around axes 140 provided approximately at the centers as arm fulcrums, respectively, so that their upper end portions can abut to and leave from the peripheral surface of the segment arrangement drum 105. The lower end portion of the arm 139A is coupled via a cam follower with a rack member 141A sliding in the direction perpendicular to the P(−) and P(+) directions, and the lower end portion of the arm 139B is coupled via a cam follower with a rack member 141B sliding in the direction perpendicular to the P(−) and P(+) directions. The rack member 141A and the rack member 141B are meshed with a pinion gear 142 so as to be coupled together via the pinion gear 142. The rack member 141A is coupled with the servomotor 143. Thus, in response to the rotation of the servomotor 143, not only the rack member 141A but also the rack member 141B slide, and therefore the pair of arms 139A and 139B synchronously rotate.

A pair of horizontal bars 144 is fixed to the upper portions of the pair of arms 139A and 139B so as to perpendicularly intersect with these arms, respectively. A pair of holders 145 is fixed respectively to the both end portions of each of the pair of horizontal bars 144. That is, two pairs of holders 145 are attached to the both end portions of the pair of horizontal bars 144. Two pairs of movable pulleys 146 for belts are rotatably supported by these two pairs of holders 145, respectively. Two fixed pulleys 147 are rotatably supported by a frame of the separation preventing means 106, two small diameter fixed pulleys 148 are rotatably supported by the frame, and a tension pulley 149 is rotatably supported by the frame between the small diameter fixed pulleys 148. Another set of the two fixed pulleys 147, the two small diameter fixed pulleys 148 and the tension pulley 149 corresponding to another pair of movable pulleys 146 is formed.

One of the pair of belts 107 arranged along the rotation axis of the segment arrangement drum 105 is stretched around the movable pulley 146 fixed to the holder 145, the two fixed pulleys 147, the two small diameter fixed pulleys 148 and the tension pulley 149 to cover the lower peripheral surface of the segment arrangement drum 105. The tension pulley 149 is connected to an air cylinder 151 via its support shaft 150. The contact pressure or abutment pressure of the belt 107 against the peripheral surface of the segment arrangement drum 105 can be variably adjusted by operating the air cylinder 151 to displace the tension pulley 149 in the upper and lower direction. The other one of the pair of belts 107 has the similar constitutions and operates similarly.

A plurality of screw holes 139a separated in the upper and lower direction from each other are formed in two rows in each of the pair of arms 139A and 139B to adjust the fixing position of the horizontal bar 144 in the upper and lower direction. As shown in FIG. 12, two long-hole shaped fixing holes 144a extended in the upper and lower direction are formed on each of the horizontal bars 144. The horizontal bars 144 are fixed to the arm 139A or 139B to be finely adjustable in the upper and lower direction by means of screws 114b inserted through these fixing holes 144a, respectively. By adjusting the fixing position of the horizontal bars 144 in the upper and lower direction, it is possible to respond to possible change in the diameter of the segment arrangement drum 105. Adjustment of the contact pressure of the pair of belts 107 against the peripheral surface of the segment arrangement drum 105 can be performed by independently adjusting the contact pressure of each belt.

Hereinafter, constitutions and operations of inserting a coil assembled in the segment arrangement drum 105 in the manufacturing apparatus of the electrical rotating machine of this first embodiment into a core 152 will be described.

Figure 13:
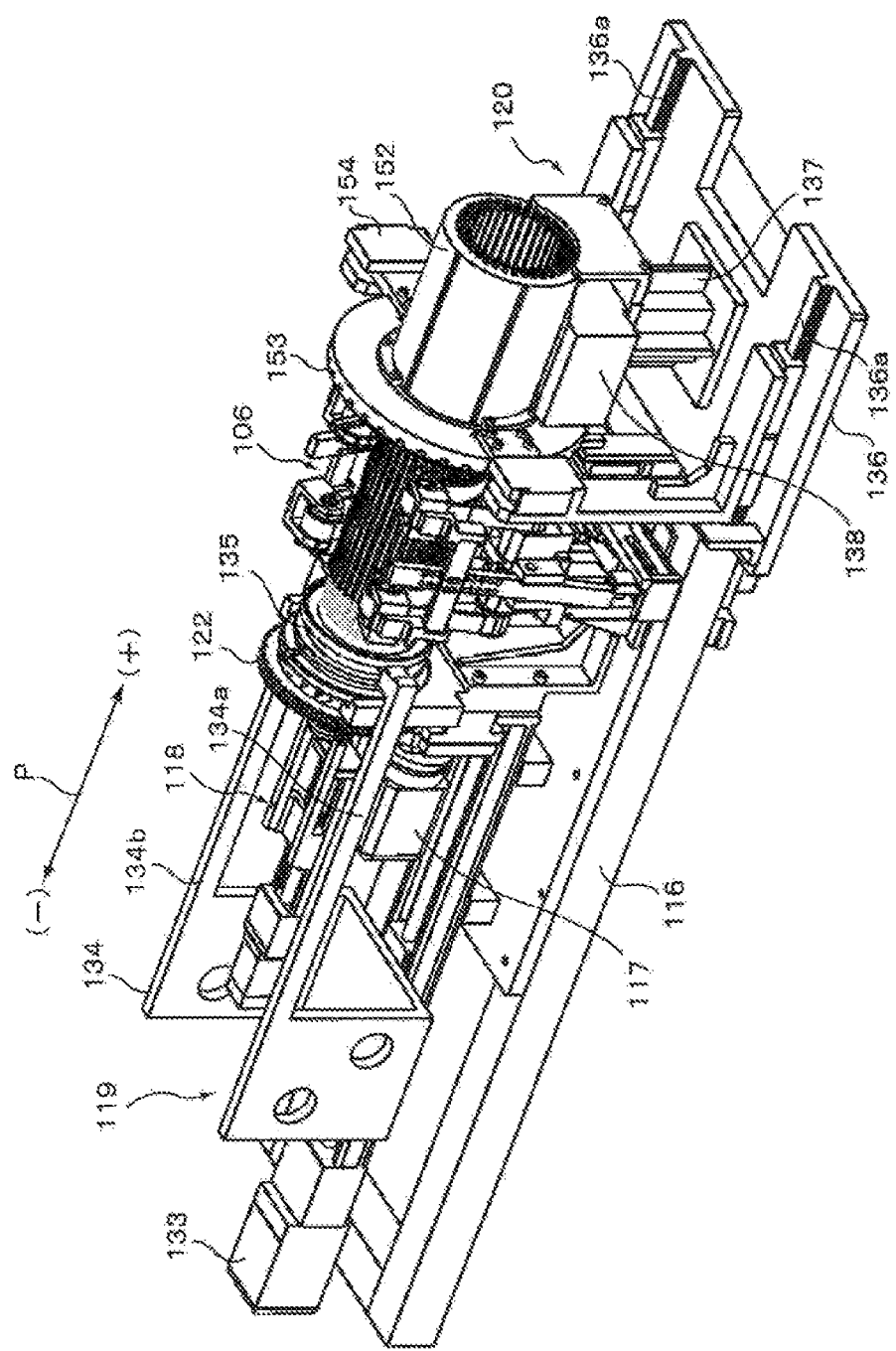
FIG. 13 is a perspective view schematically illustrating the state where the coil assembling apparatus is coupled with a work support, in the manufacturing apparatus of the electrical rotating machine in the first embodiment.

In the coil assembling section 2, assembling of coil is performed as aforementioned by arranging the plurality of coil segments 17S on the peripheral surface of the segment arrangement drum 105. Then, the assembled coil is inserted into the core 152 of the electrical rotating machine. In this process, at first, the work support base 120 on which the core 152 is set is coupled to the base 116 in the coil assembling section 2. FIG. 13 indicates the state where the core 152 is set on the work support base 120 and then the work support base 120 is coupled with the base 116 so that the assembled coil on the segment arrangement drum 105 can be inserted into the core 152. That is, the core 152 is placed on a work carrying portion 138 under the state where the work support base 120 is separated from the base 116, and then a cuffs supporter 154 for supporting an insertion guide unit 153 is moved along the rails 136a from P(−) direction of the work support base 120 to couple the ring-shaped insertion guide unit 153 with the core 152. Thereafter, the work support base 120 is coupled with the base 116 of the coil assembling section 2 so that the insertion guide unit 153 opposes to the segment arrangement drum 105. In FIG. 13, the guide member 112 is omitted from showing.

Figure 14:
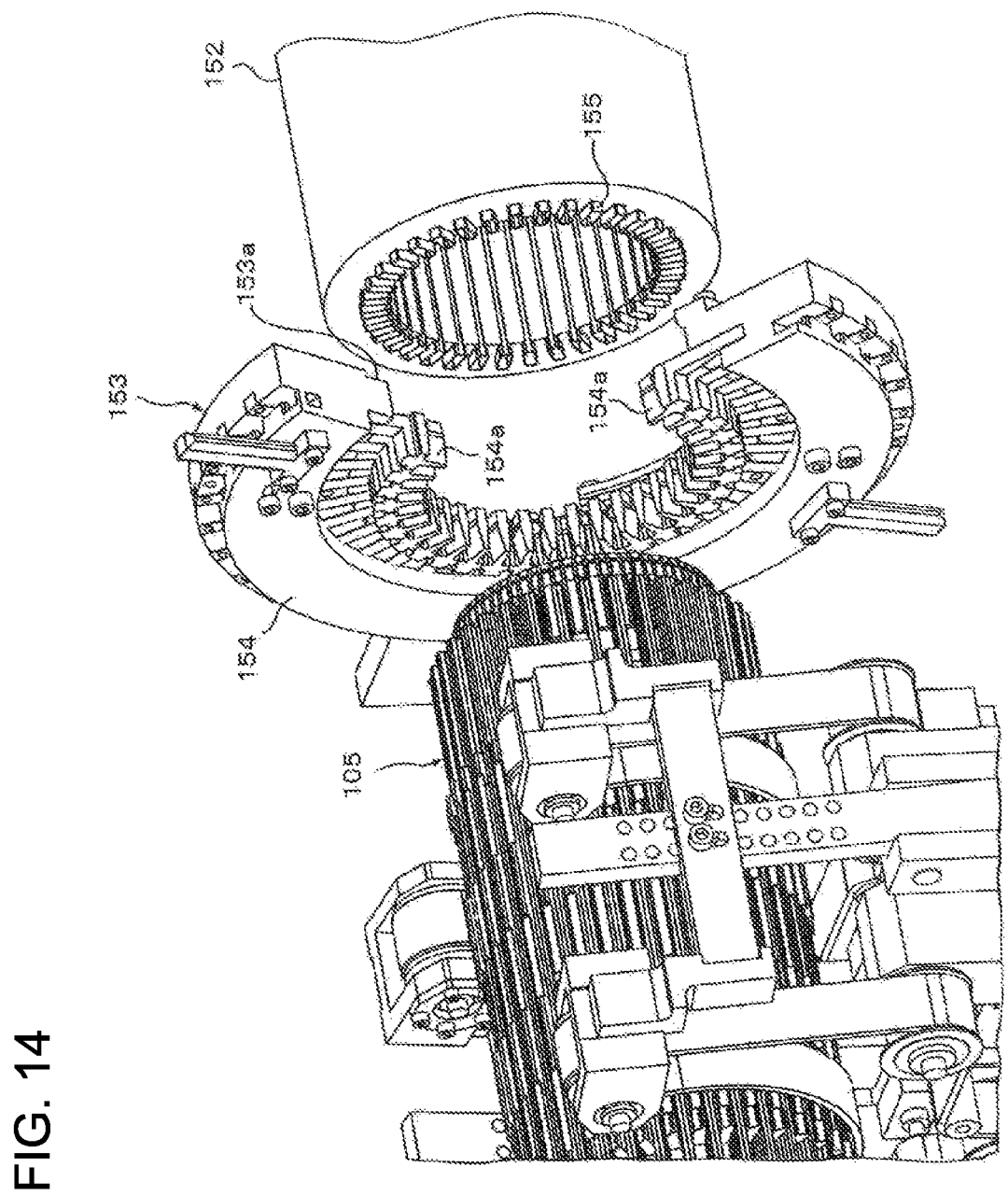
FIG. 14 is an exploded perspective view schematically illustrating the constitution for inserting an assembling coil into a core, in the manufacturing apparatus of the electrical rotating machine in the first embodiment.

The insertion guide unit 153 has, as shown in FIG. 14, the cuffs supporter 154 on the surface facing to the segment arrangement drum 105 and a concave portion 153a fitted with the core 152 on the opposite surface. The cuffs supporter 154 is used to protect a cuffs portion 155 made of an insulation paper inserted in each slot of the core 152. The cuffs portion 155 of the core 152 is inserted between a plurality of radial projections 154a arranged along the circumferential direction, respectively. The plurality of projections 154a can simultaneously slide in the radial direction by a drive mechanism not shown.

Figure 15:
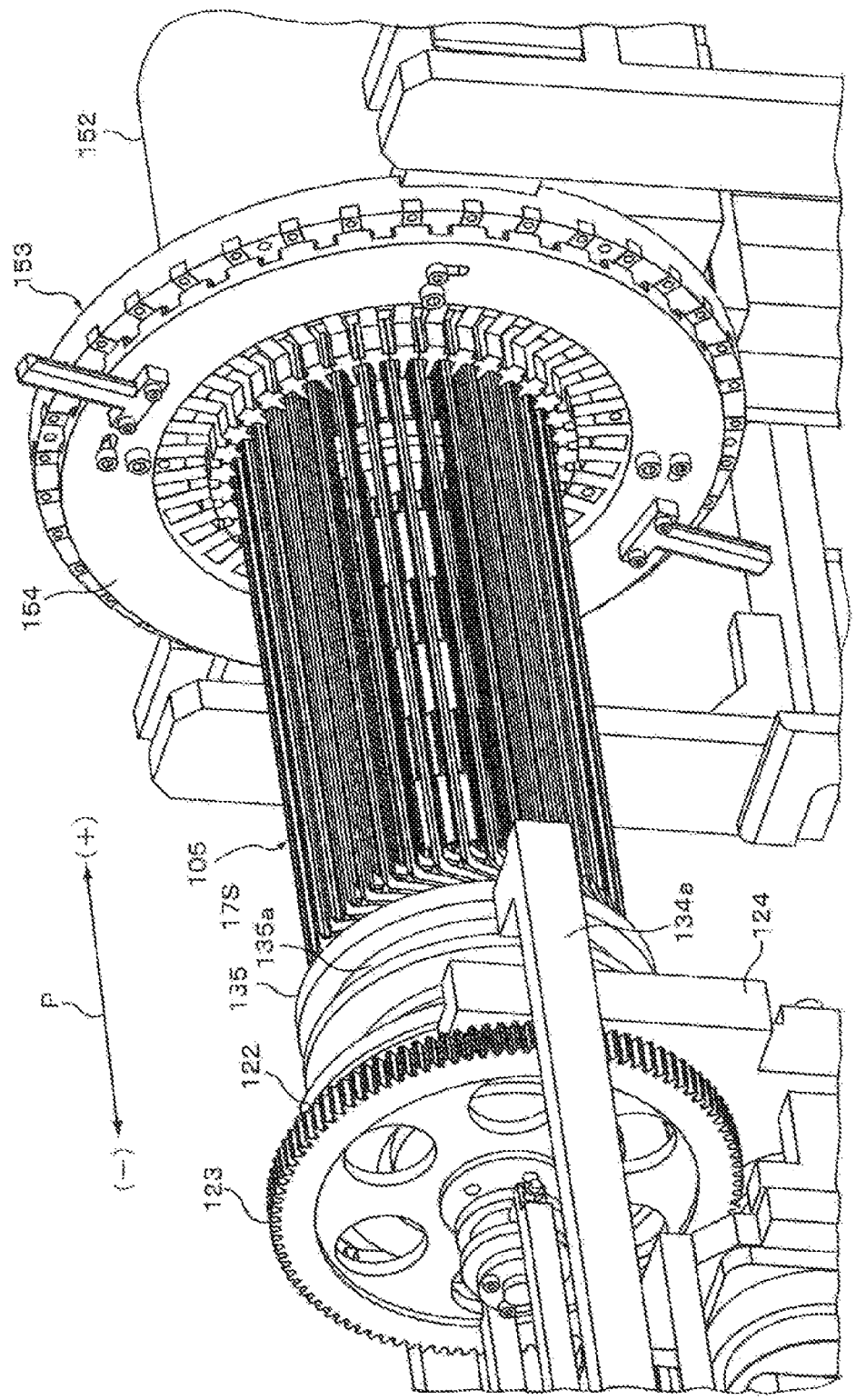
FIG. 15 is a perspective view schematically illustrating the state where a part of the assembling coil is inserted into an insertion guide in the manufacturing apparatus of the electrical rotating machine in the first embodiment.

In the segment arrangement drum 105, when a predetermined number of layers consisting of a predetermined number of the coil segments 17S are inserted to complete the coil assembling, a servomotor 133 in the push-out mechanism 119 rotates to move a slide member 134 to the P(+) direction so as to move the press ring 135 to the P(+) direction along the peripheral surface of the segment arrangement drum 105. A concave portion (not shown) for housing along entire circumferential direction the coil end portion (linking portion) of the assembled coil is formed in the P(+) direction side of the press ring 135. The assembled coil of which the coil end portion is held inside of this concave portion is moved along the peripheral surface of the segment arrangement drum 105, and then the coil end portion (linking portion) of the assembled coil is inserted into the insertion guide unit 153 as shown in FIG. 15. That is, end portions of the front leg and the rear leg of each coil segment 17S are inserted between projections 154a of the insertion guide unit 153, respectively. The servomotor 133 is stopped its rotation to stop the movement of the press ring 135 just before the coil end portions (linking portion) of the assembled coil interfere with the blades 108 of the segment arrangement drum 105, or just before the press ring 135 abuts against the separation preventing means 106.

The segment arrangement drum 105 is supported at both ends by inserting the coil end portion (linking portion) of the assembled coil into the insertion guide unit 153. While the segment arrangement drum 105 is supported at both ends, the servomotor 117 of the blade adjustment mechanism 118 rotates to move the slide member 128 (FIG. 9) to the P(+) direction so that no blade 108 protrudes from the peripheral surface of the segment arrangement drum 105, that is the blades 108 retreat to the position where the movement of the press ring 135 is not disturbed. Then, a servomotor 143 (FIG. 11) of the separation preventing means 106 rotates to open the two pairs of arms 139A and 139B so as to leave from the peripheral surface of the segment arrangement drum 105 to the radial outward direction, and thus the abutment of the belt 107 against the segment arrangement drum 105 is released. Thereafter, the separation preventing means 106 is lowered down so that the movement of the press ring 135 is not disturbed.

Figure 16:
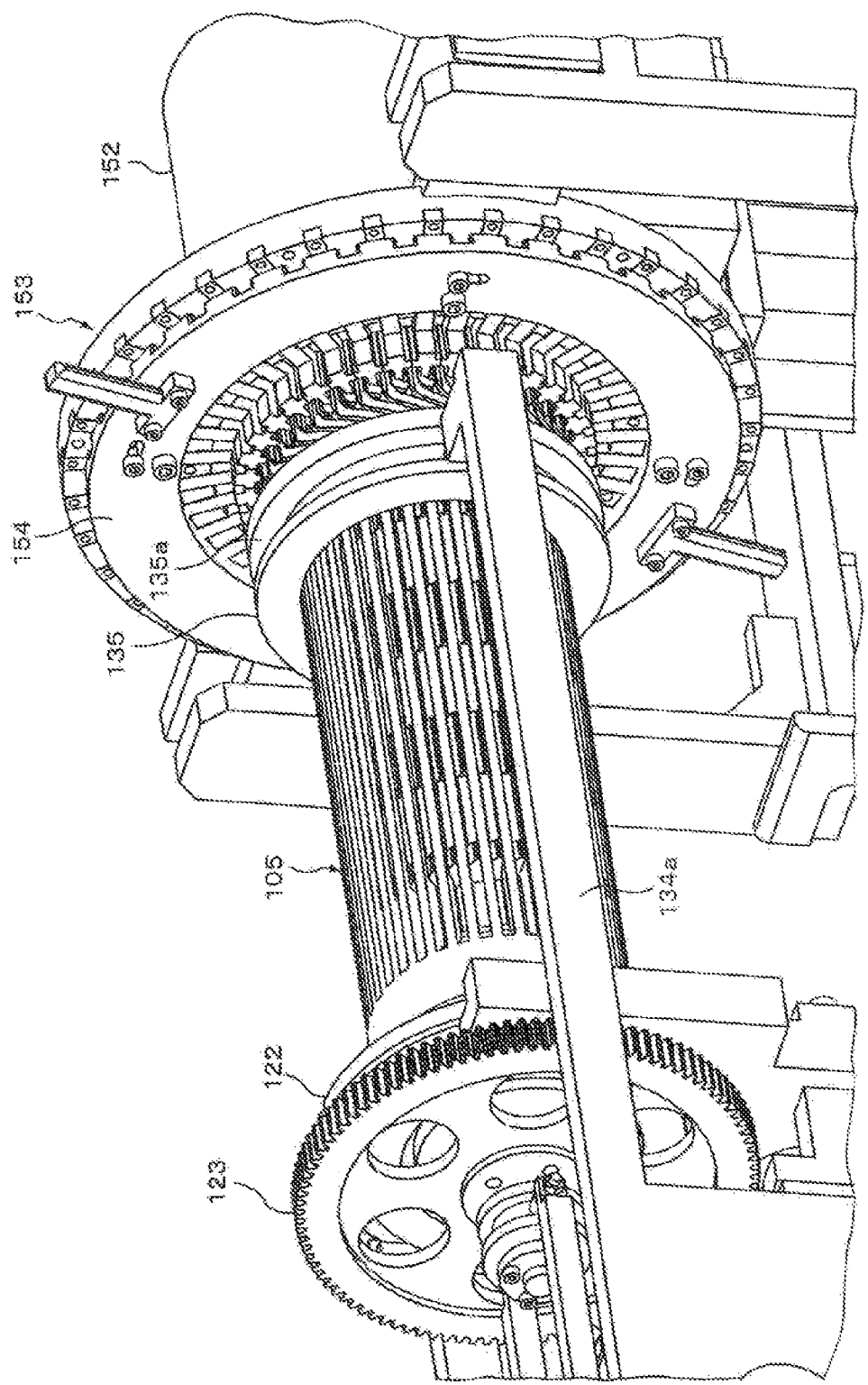
FIG. 16 is a perspective view schematically illustrating the state just before the insertion of the assembling coil into the core is completed in the manufacturing apparatus of the electrical rotating machine in the first embodiment.
Figure 17:
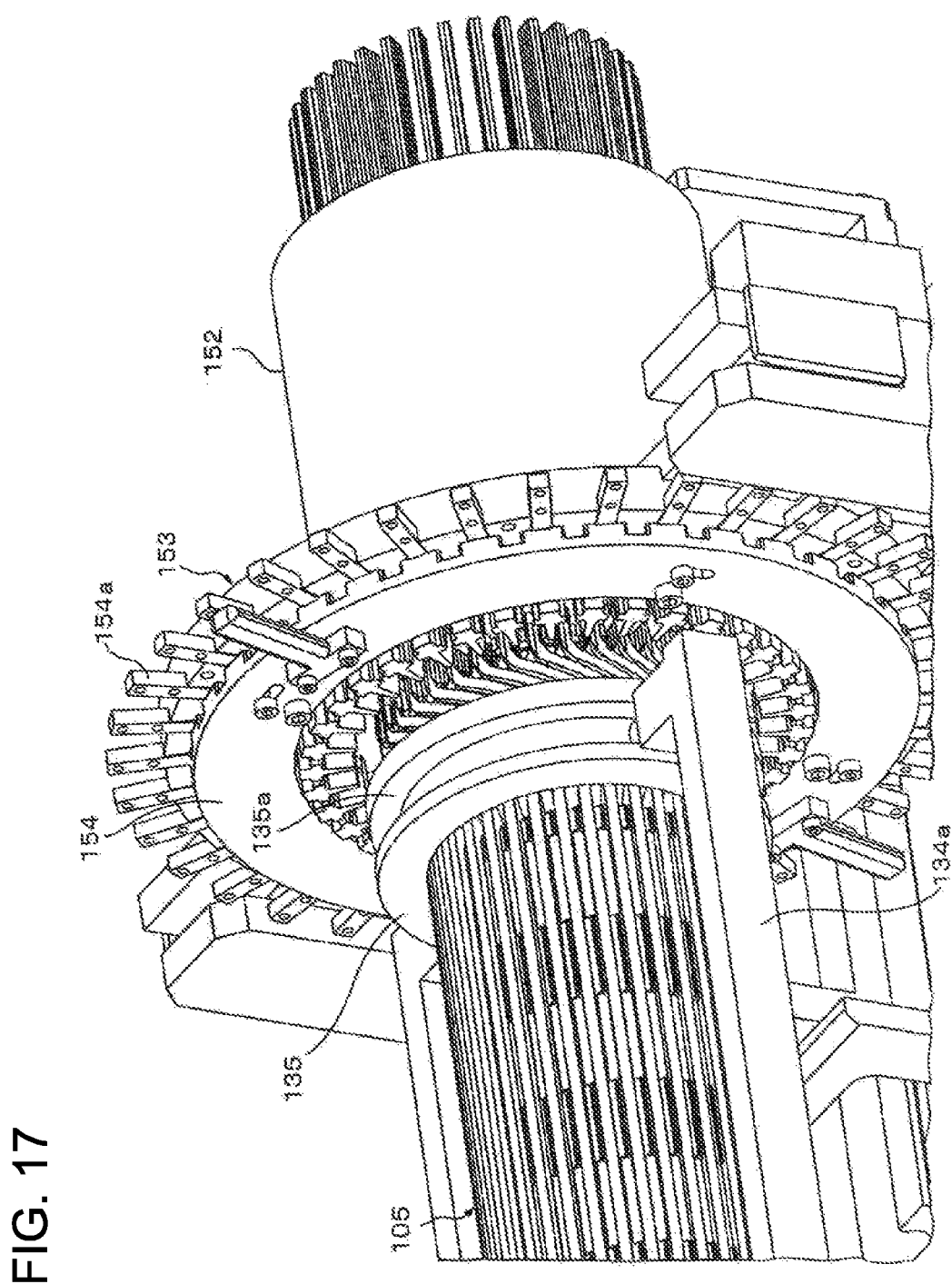
FIG. 17 is a perspective view schematically illustrating the state where a cufflinks supporter is released just before completion of the insertion of the assembling coil into the core in the manufacturing apparatus of the electrical rotating machine in the first embodiment.

After the separation preventing means 106 is completely lowered, the press ring 135 is moved to the P(+) direction so that the insertion of the assembled coil into the core 152 proceeds. As shown in FIG. 16, the movement of the press ring 135 is stopped just before the coil end portions (linking portion) of the assembled coil abut to the cuffs supporter 154. Then, as shown in FIG. 17, all the projections 154a of the cuffs supporter 154 are moved to the radial outward direction, and thereby the cuffs supporter 154 is outwardly opened.

Figure 18:
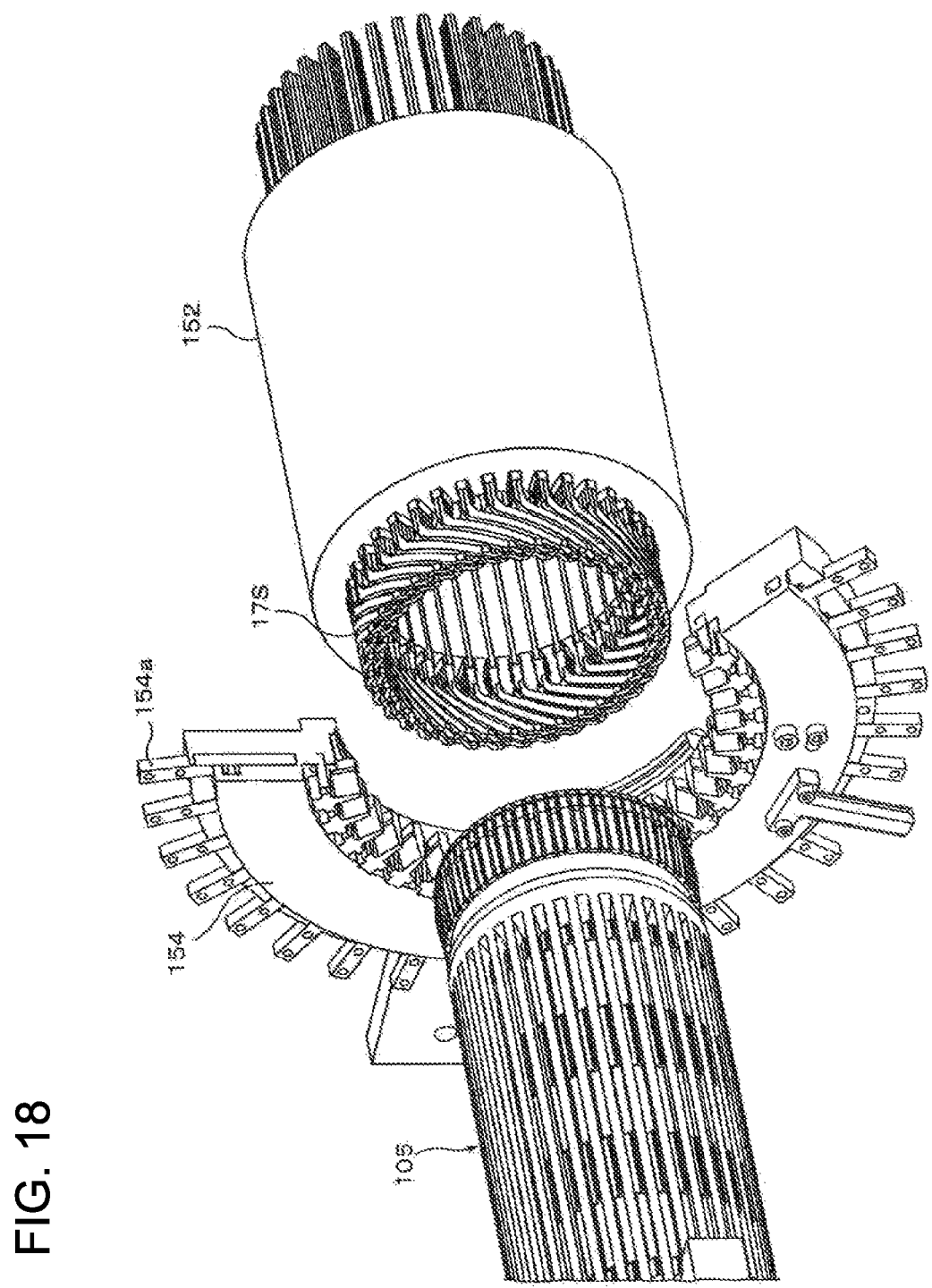
FIG. 18 is an exploded perspective view schematically illustrating the state where the insertion of the assembling coil into the core is completed in the manufacturing apparatus of the electrical rotating machine in the first embodiment.

Thereafter, the press ring 135 is advanced to a predetermined position, and the movement of the press ring 135 is stopped just before the coil end portions (linking portion) of the assembled coil abut to the cuffs supporter 154. The stoppage timing of the movement of the press ring 135, and the stoppage timing of the predetermined distance advance of the press ring 135 after the opening of the cuffs supporter 154 are controlled based on values preliminarily stored in a memory of the control means 49. After completion of the insertion, the press ring 135 is returned to an original position (initial position) by the operation of the push-out mechanism 119. FIG. 18 indicates the state after completion of the insertion of the assembled coil into the core 152.

As aforementioned, according to the coil assembling section 2 of this first embodiment, the assembled coil that is assembled by arranging the plurality of coil segments on the segment arrangement drum 105 can be inserted into the core 152 by pushing out the assembled coil to the axial direction of the segment arrangement drum 105. Therefore, process of changing the jig and the core after having pulled up the segment assembly from the jig, and process of inserting the segment assembly into the changed core are not necessary to perform, resulting the work efficiency in the fabrication of the electrical rotating machine to extremely improve. In other words, according to the constitution of this first embodiment, when the assembling of the coil segments is completed, the segment assembly can be promptly inserted into the core 152 as it resulting that unnecessary time for changing the jig and the core can be omitted.

Figure 19:
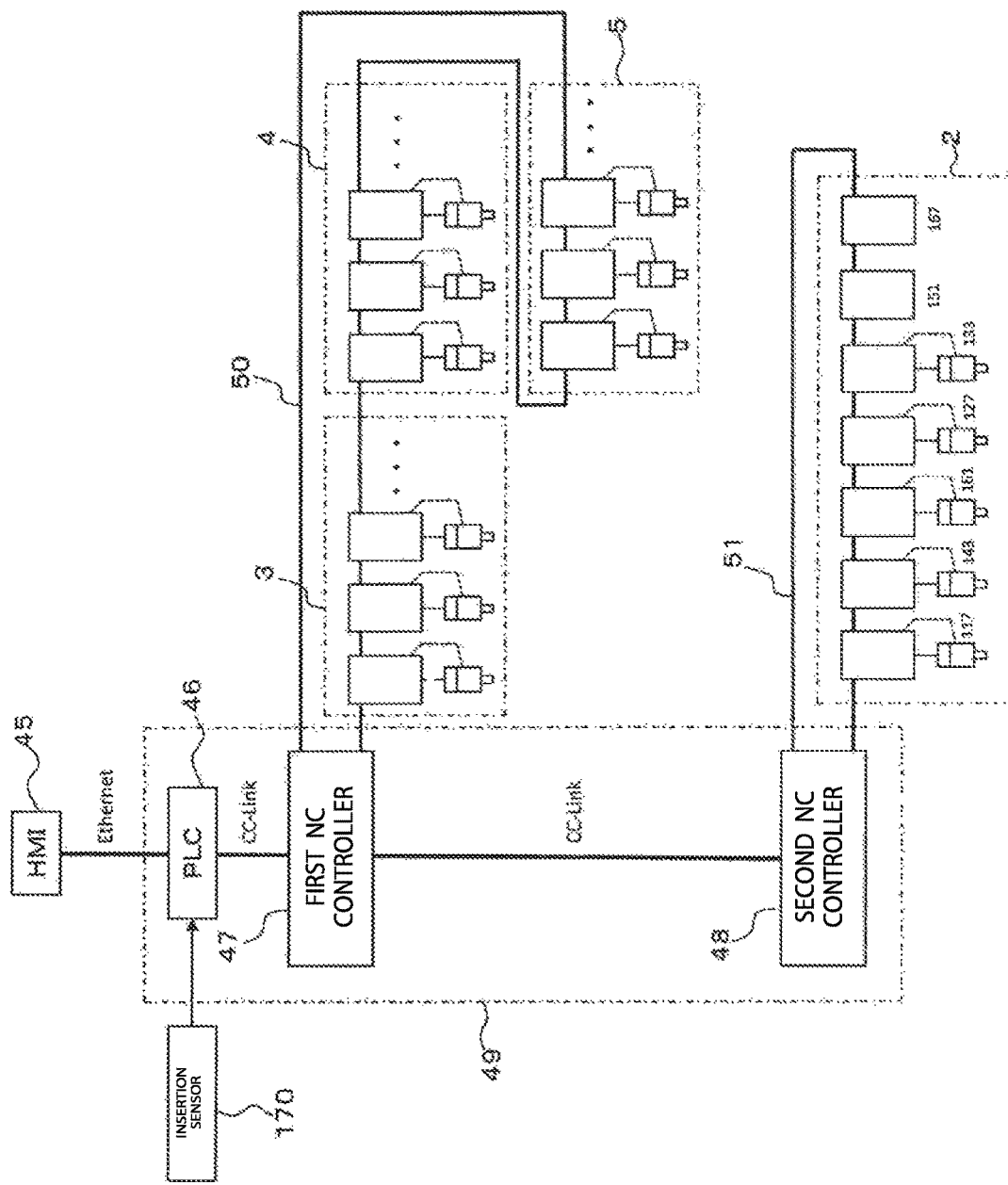
FIG. 19 is a block diagram schematically illustrating an electrical constitution of the manufacturing apparatus of the electrical rotating machine in the first embodiment.

FIG. 19 illustrates an electrical configuration of the manufacturing apparatus of the electrical rotating machine in this first embodiment. As shown in the figure, the apparatus has a human-machine interface (HMI) 45 including an input and display means such as a touch panel, for inputting control data for shaping the wire rod, for instructing reading of control data stored in a memory, for instructing modification of the control data stored in the memory, for instructing start of the NC control, or for instructing end of the NC control for example. The HMI 45 is connected to a programmable logic controller (PLC) 46 through Ethernet (registered trademark). A first NC controller 47 and a second NC controller 48 are connected to the PLC 46 by means of a high-speed network such as CC-Link. The PLC 46 is provided with a memory for storing at least control data and control program for shaping coil segments with various kinds of shape, a central processing unit (CPU) and an input-output interface. The CPU transfers control data indicated by the program to the first NC controller 47 and the second NC controller 48. The first NC controller 47 expands control data of a length of the wire rod, a center angle θ1 of the coil segment, a pitch, and a shoulder angle θ2 of the coil segment, and data for executing multiaxial control with respect to the first bending section 4. The first NC controller 47 also expands control data of shaping the curved shape of the linking portion 17a and of shaping the crank-shaped step for example, and data for executing multiaxial control with respect to the second bending section 5. The second NC controller 48 expands control data of coil assembling and assembled coil insertion into the core for coil assembling for example in the coil assembling section 2. A control unit 49 for controlling the wire rod providing section 3, the first bending section 4, the second bending section 5 and the coil assembling section 2 is configured by the PLC 46, the first NC controller 47 and the second NC controller 48.

The first NC controller 47 is connected to the wire rod providing section 3, the first bending section 4 and the second bending section 5 through an optical communication cable 50 used for establishing servo-link. In the wire rod providing section 3, the first bending section 4 and the second bending section 5, a plurality of amplification and drive circuits are connected to the optical communication cable 50, and a plurality of servomotors are connected to the plurality of amplification and drive circuits, respectively. Signal lines from encoders mechanically coupled with the plurality of servomotors are connected to the plurality of amplification and drive circuits, respectively.

The second NC controller 48 is connected to the coil assembling section 2 through an optical communication cable 51 used for establishing servo-link. In this embodiment, the coil assembling section 2 has the index rotation drive mechanism of the segment arrangement drum 105, the separation preventing means 106, the segment transport means 110, the blade adjustment mechanism 118 and the push-out mechanism 119. An amplification and drive circuit of the servomotor 117 in the index rotation drive mechanism, an amplification and drive circuit of the servomotor 143 for opening and closing the pair of arms 139A and 139B in the separation preventing means 106, an amplification and drive circuit of the servomotor 161 for rotating the chucking portion 111 in the segment transport means 110, an amplification and drive circuit of the servomotor 127 for adjusting the protruded amount of the blades 108, an amplification and drive circuit of the servomotor 133 for pushing out the assembled coil, and a drive circuit of the air cylinders 151 and 167 are connected to the optical communication cable 51. Signal lines from encoders mechanically coupled with the plurality of servomotors are connected to the plurality of amplification and drive circuits, respectively.

Figure 20:
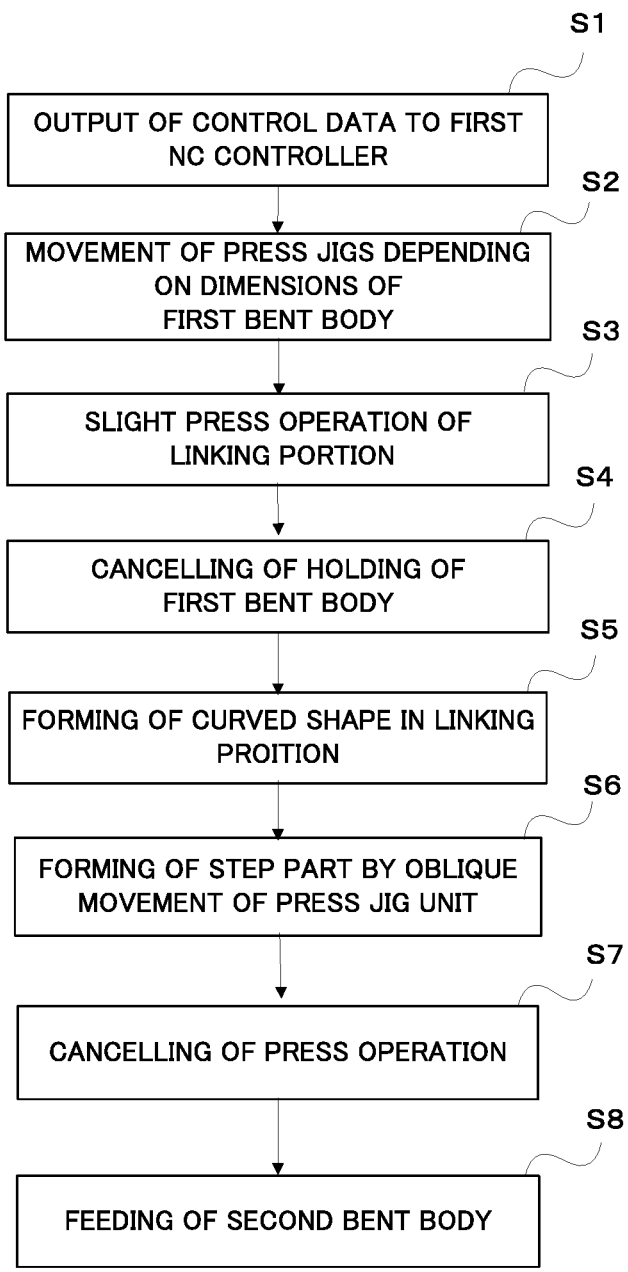
FIG. 20 is a flowchart schematically illustrating control processes of the coil assembling apparatus in the first embodiment.

The PLC 46 and the second NC controller 48 control insertion operations of the coil segments and insertion operations of the assembled coil into the core 152 in the coil assembling section 2 based on the steps of FIG. 20. Hereinafter, operations in the coil assembling section 2 will be described with reference to the flow charts of FIG. 20 in detail.

At first, the PLC 46 reads out, from the memory a series of control data for coil assembling operations, that is a number and layer number of coil segments applied to the segment arrangement drum 105 in the coil assembling section 2, a rotating amount of index, a rotating amount of the arms 139A and 139B in the separation preventing means 106, a protruded amount of the blades 108 and a moving amount of the press ring 135 for example, and outputs the control data to the second NC controller 48 (Step S1).

The second NC controller 48 then expands the received control data and performs NC control of a drive mechanism with the designated address. First, an index control for arranging the coil segments 17S on the peripheral surface of the segment arrangement drum 105 is performed (Step S2). When the first coil segment 17S that is the coil segment to be formed is transported by the segment transport means 110, the insertion of the front leg of the transported first coil segment into the segment hold portion 109a, that is the reference point, of the segment arrangement drum 105 is detected by the detection sensor 170, and a detection signal is sent to the PLC 46, the servomotor 117 is rotationally driven to rotate the segment arrangement drum 105 by an angle of one slot (10 degrees in this first embodiment) to the anticlockwise direction in FIG. 2A. This operation is repeated in stages. When the arrangement of the coil segments 17S on the segment arrangement drum 105 for a predetermined number of rounds is completed, the servomotor 127 is rotationally driven to protrude the blades 108 from the segment arrangement drum 105 by a predetermined height (Step S3).

The detection sensor 170 of this first embodiment is desirably a distance judgement sensor using a laser or else. As shown in FIG. 2A, a laser emitting part and a laser receiving part are arranged on the under surface of the guide member 112. The distance is determined by irradiating a laser light from the light emitting part to the segment hold portion, that is a reference point, and by receiving the reflected light at the laser receiving part. The PLC 46 is possible to judge whether the coil segment of the first round is inserted or the coil segment of the second or later round is inserted depending on the determined distance and send the result of the judgment to the second NC controller 48. In modification, a sensor for emitting and receiving a color light may be mounted in addition to the distance judgement sensor. Namely, a color light sensor provided with line shaped light emitting part and light receiving part extending along the axial direction of the segment arrangement drum 105 and the distance judgment sensor are arranged side by side on the under surface of the guide member 112. A color light from the light emitting part to the segment hold portion, that is a reference point, and the reflected color light is received by the light receiving part. The PLC 46 calculates a spectrum light intensity of the reflected light applied from the detection sensor 170 and compares the calculated light intensity with a reference spectrum light intensity range stored beforehand. If the detected and calculated spectrum light intensity is within an allowable range set beforehand, the PLC 48 judges that the front leg is normally inserted and arranged and sends the result of the judgment to the second NC controller 48. Since the coil segment 17S is in general a copper color that is different from the color of the blades 108 and the color of the peripheral surface of the segment arrangement drum 105, it is possible to distinguish the reflected light of the front leg of the coil segment from the reflected light of other portions. In modification, the judgement of whether the front leg is normally arranged or not may be performed by using combination of a photoelectric sensor such as a color sensor and an image sensor such as a charge coupled device (CCD) or a complementary metal oxide semiconductor (CMOS). If the combination of sensors using different detection methods is used, it is possible to lower the detection error.

When an assembled coil is formed by arranging, in a predetermined number of layers, the coil segments 17S on the segment arrangement drum 105, the second NC controller 48 starts NC control operations for inserting the assembled coil into the core (Step S4). That is, the second NC controller 48 expands the control data for inserting the assembled coil into the core 152 and outputs the expanded control data to the push-out mechanism 119, the blade adjustment mechanism 118 and the separation preventing means 106 to start the insertion operations by rotationally driving the corresponding servomotors.

At first, the second NC controller 48 performs NC control for moving the press ring 155 to the P(+) direction by rotationally driving the servomotor 133 of the push-out mechanism 119 so as to insert the end portion of the slot insertion portion of the assembled coil into the insertion guide unit 153 (Step S5). This movement of the press ring 135 is stopped just before the coil end portions (linking portion) of the assembled coil interfere with the blades 108, or just before the press ring 135 abuts against the separation preventing means 106. Thus, the segment arrangement drum 105 is supported at both ends. FIG. 15 shows this state.

Then, the second NC controller 48 performs NC control for moving back the blades 108 so that no blade protrudes from the peripheral surface of the segment arrangement drum 105 by rotationally driving the servomotor 127 of the blade adjustment mechanism 118, for separating the belt 107 from the peripheral surface of the segment arrangement drum 105 by rotationally driving the servomotor 143 of the separation preventing means 106, and for lowering down the separation preventing means 106 (Step S6).

Then, the second NC controller 48 performs NC control for moving the press ring 155 to the P(+) direction by rotationally driving the servomotor 133 of the push-out mechanism 119 and for stopping the movement of the press ring 155 just before the coil end portions (linking portion) abuts against the cuffs supporter 154 (Step S7). FIG. 16 shows this state.

Then, the second NC controller 48 performs NC control for opening the cuffs supporter 154 by controlling a drive mechanism not shown so that all the protrusions 154a of the cuffs supporter 154 move toward the radial outward direction (Step S8). FIG. 17 shows this state.

Thereafter, the second NC controller 48 performs NC control for advancing the press ring 155 to a predetermined position by rotationally driving the servomotor 133 of the push-out mechanism 119 to complete the insertion of the assembled coil into the core 152, that is, the annular insertion of the coil segments into the slots of the core 152 (Step S9). After the insertion of the coil segments, the press ring 135 is returned to the original position. FIG. 18 shows this state.

Figure 21:
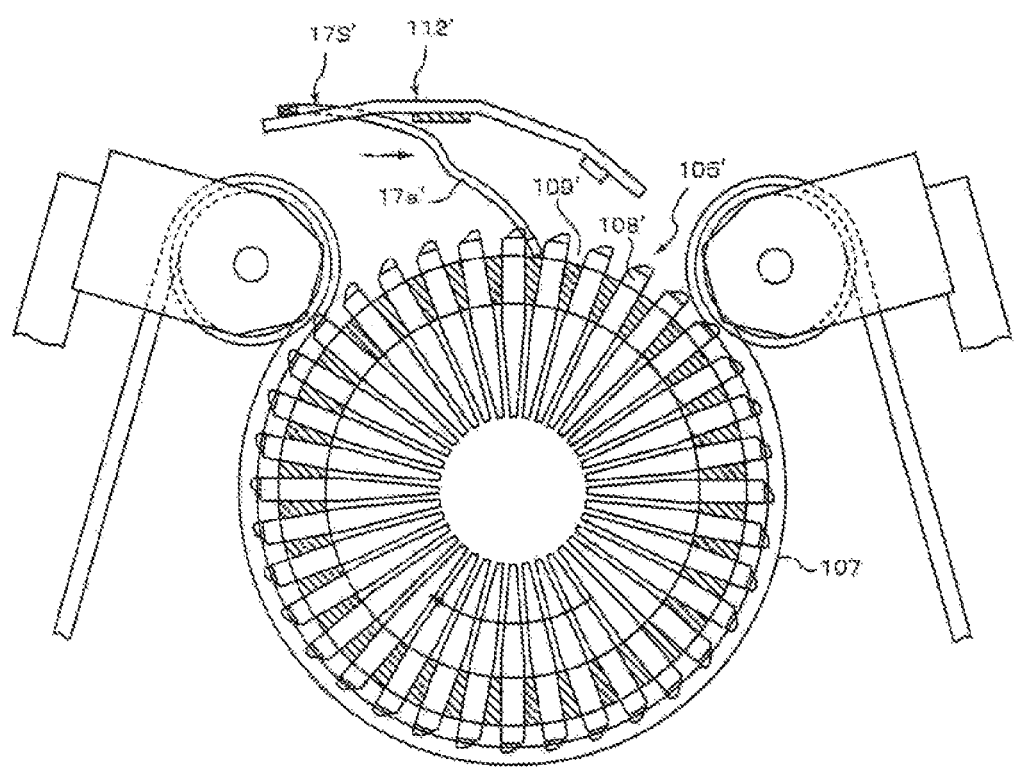
FIG. 21 is an essential part sectional view illustrating the state where a first coil segment is inserted into a segment hold section in the coil assembling apparatus in a modification of the first embodiment.

Now, a modification of the aforementioned first embodiment will be described. In the first embodiment, as shown in FIG. 2A, the step of the linking portion 17a of the coil segment 17S is inclined upward right when seen from the segment inserting side, the segment arrangement drum 105 rotates to the counterclockwise direction in the figure, and the guide member 112 is inclined downward left. However, in the modification, the step of the linking portion 17a' of the coil segment 17S' is inclined downward right when seen from the segment inserting side, and thus the segment assembling section for assembling coil segments 17S' (the segment arrangement drum 105', the blade 108' and the segment hold portion 109') has the inversed (mirror image) configuration as that of the first embodiment as shown in FIG. 21. Also, in the modification, the segment arrangement drum 105' rotates to the clockwise direction in the figure, and the guide member 112' is inclined downward right. Although, it is not shown, the segment transport means has the inversed configuration. Since the constitutions, operations and advantages of other portion in this modification are the same these in the first embodiment, explanation of these will be omitted.

Next, a manufacturing apparatus of an electrical rotating machine in a second embodiment according to the present invention will be described with reference to FIGS. 22A to 22D, FIG. 23 and FIG. 24. In this second embodiment, as shown in FIGS. 22A to 22D, FIG. 23 and FIG. 24, a guide means of a coil assembling section has a two stage (two layer) construction so that two different kinds of coil segments with different linking portions and different coil widths to each other can be assembled. Other constitutions, operations and advantages in this embodiment are the same as these in the aforementioned first embodiment. Therefore, detail explanations of this second embodiment will be omitted and the same reference numerals may be used in this second embodiment for the similar components as these in the aforementioned first embodiment.

Figure 22A:
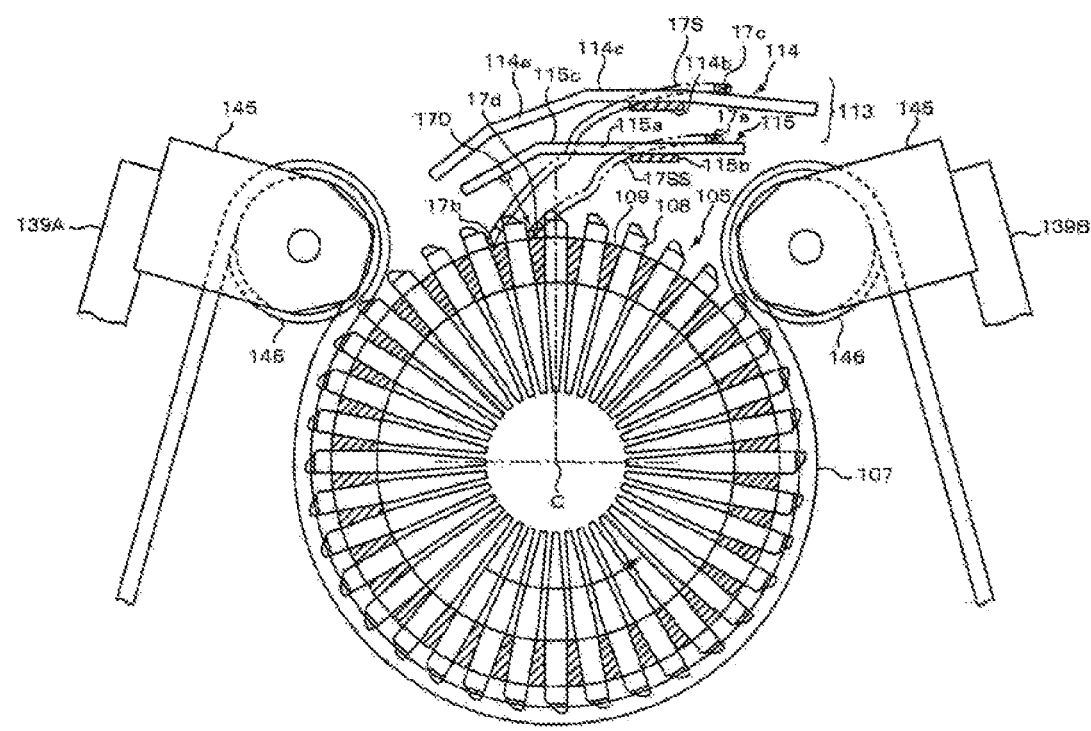
FIG. 22A is an essential part sectional view illustrating the state where first and second coil segments are inserted into a segment hold section, in a coil assembling apparatus in a second embodiment according to the present invention.
Figure 24:
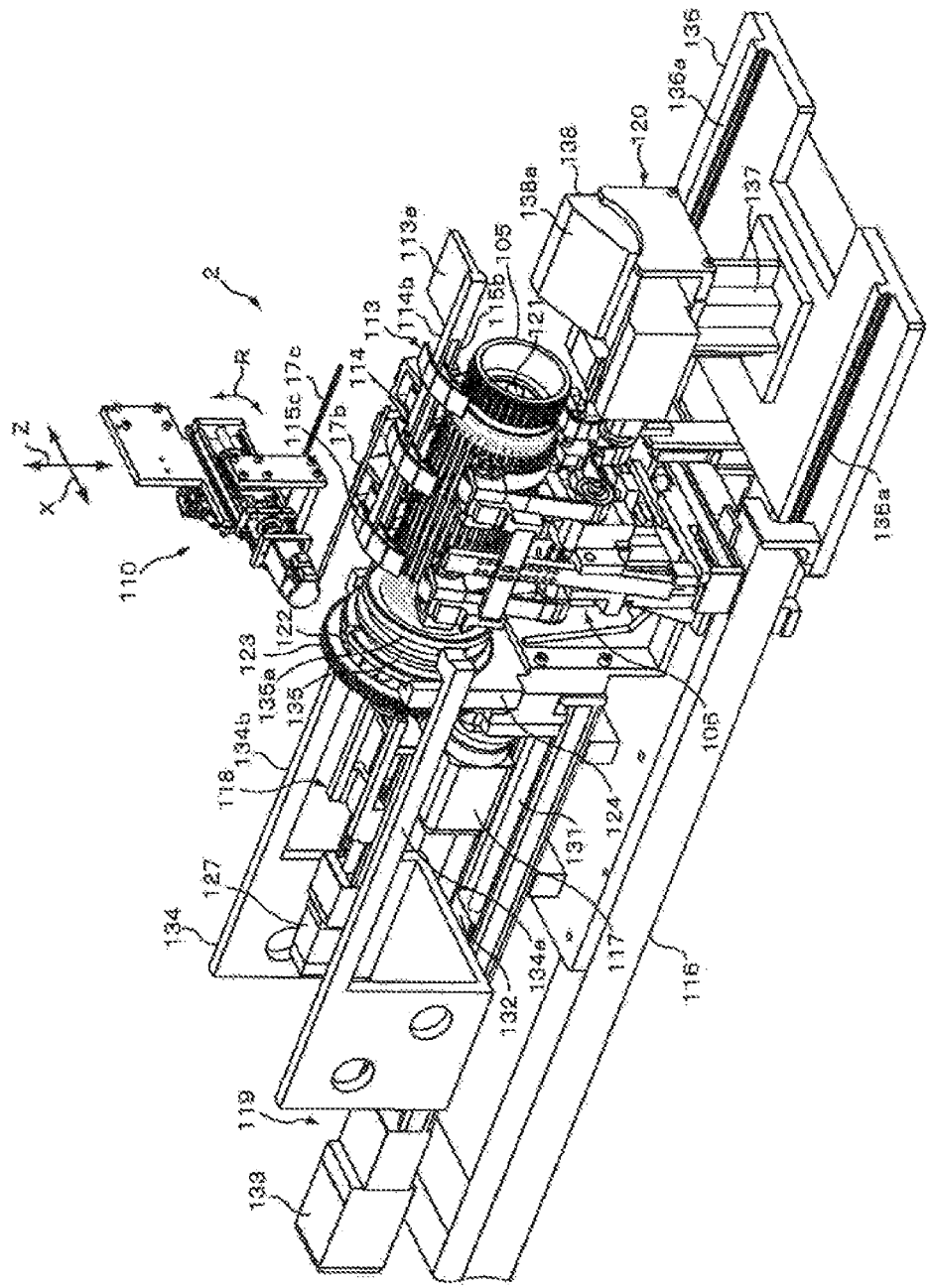
FIG. 24 is a perspective view schematically illustrating the whole constitution of the coil assembling apparatus in the second embodiment.

As shown in FIG. 22A and FIG. 24, the guide means 113 in this second embodiment has the two stage (two layer) configuration consisting of an outer guide member 114, and an inner guide member 115 located nearer than the outer guide member 114 with respect to the center axis C of the segment arrangement drum 105. The outer guide member 114 and the inner guide member 115 are arranged above the segment arrangement drum 105. The configuration of the outer guide member 114 and the inner guide member 115 is basically the similar as that of the guide member 112 in the first embodiment shown in FIG. 6. That is, each of the outer guide member 114 and the inner guide member 115 has a plurality (three in this embodiment) of guide pieces with a small width, and the bracket 114b or 115b for supporting these guide pieces away from each other. The bracket 114b or 115b is formed along the axial direction of the segment arrangement drum 105, and the guide pieces extend to the direction perpendicular to the bracket 114b or 115b. The bracket 114b and 115b are fixed to a frame (not shown). The outer guide member 114 is formed in order to guide a large width coil segment 17S that has a large distance between slot insertion portions 17b and 17c, the inner guide member 115 is formed in order to guide a small width coil segment 17SS that has a small distance between slot insertion portions 17d and 17e.

The inner guide member 115 is configured that a length along the circumferential direction of its guide surface 115c is shorter than a length along the circumferential direction of a guide surface 114c of the outer guide member 114. The large width coil segment 17S is gripped by the chucking portion 111 of the segment transport means 110 and, under this state, the coil segment 17S is transported so that its front leg 17b passes under the inner guide member 115 and its rear leg 17c passes above the outer guide member 114. The front leg 17b of the coil segment 17S is lowered when this front leg 17b reaches a position of the segment hold portion above the segment arrangement drum 105, which position is the reference point. The small width coil segment 17SS is gripped by the chucking portion 111 of the segment transport means 110 and, under this state, the coil segment 17SS is transported so that its front leg 17*d* passes under the inner guide member 115 and its rear leg 17*e* passes above this inner guide member 115. The front leg 17*d* of the coil segment 17SS is lowered when the this front leg 17*d* reaches a position of the segment hold portion by the index rotation of the segment arrangement drum 105 above this drum 105, which position is the reference point. In case of such two stage (two layer) configurations of the guide members, the detection sensor 170 is arranged on the under surface of the inner guide member 115 to detect the front leg 17*d* of the coil segment 17SS.

Figure 22B:
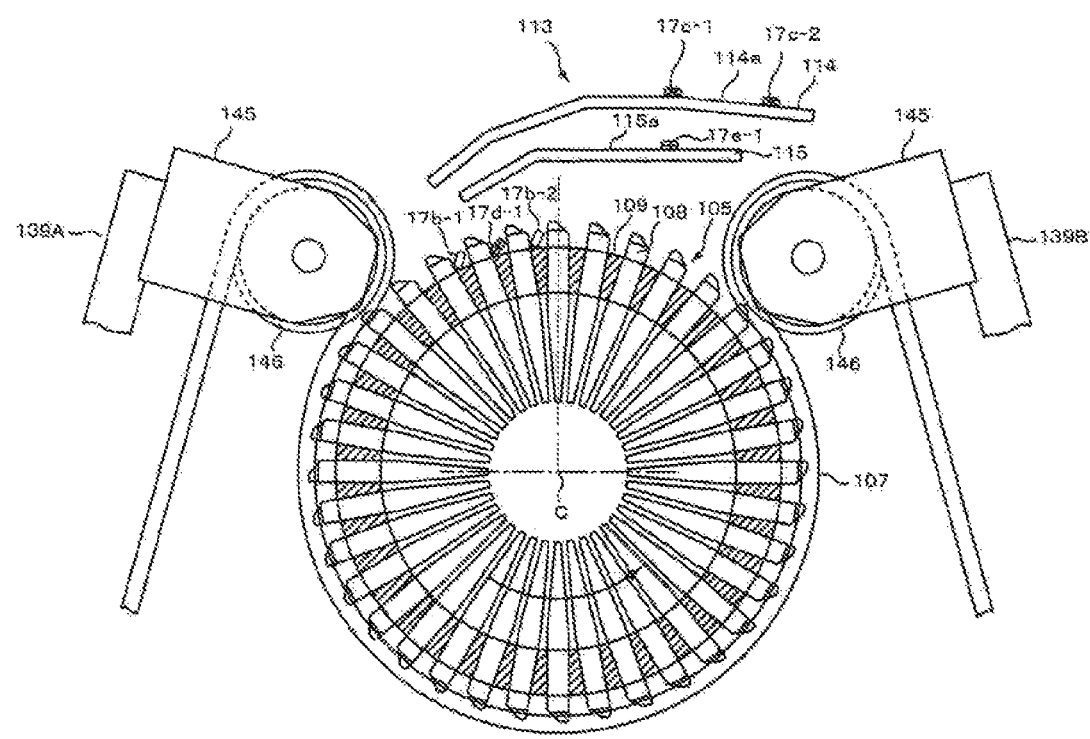
FIG. 22B is an essential part sectional view illustrating the state where front legs from first to third coil segments are inserted into the segment hold section, in the coil assembling apparatus in the second embodiment.

In this second embodiment, coil assembling is performed by alternately supplying the large width coil segment 17S and the small width coil segment 17SS. FIG. 22B indicates the state where the front leg 17*b*-1 of the first large width coil segment 17S is inserted into the predetermined segment hold portion 109 of the segment arrangement drum 105 and the rear leg 17*c*-1 thereof is laid on the outer guide member 114, the front leg 17*d*-1 of the second small width coil segment 17SS is inserted into the next segment hold portion 109 of the segment arrangement drum 105 and the rear leg 17*e*-1 thereof is laid on the inner guide member 115, and the front leg 17*b*-2 of the third large width coil segment 17S is inserted into the next segment hold portion 109 of the segment arrangement drum 105 and the rear leg 17*c*-2 thereof is laid on the outer guide member 114.

Figure 22C:
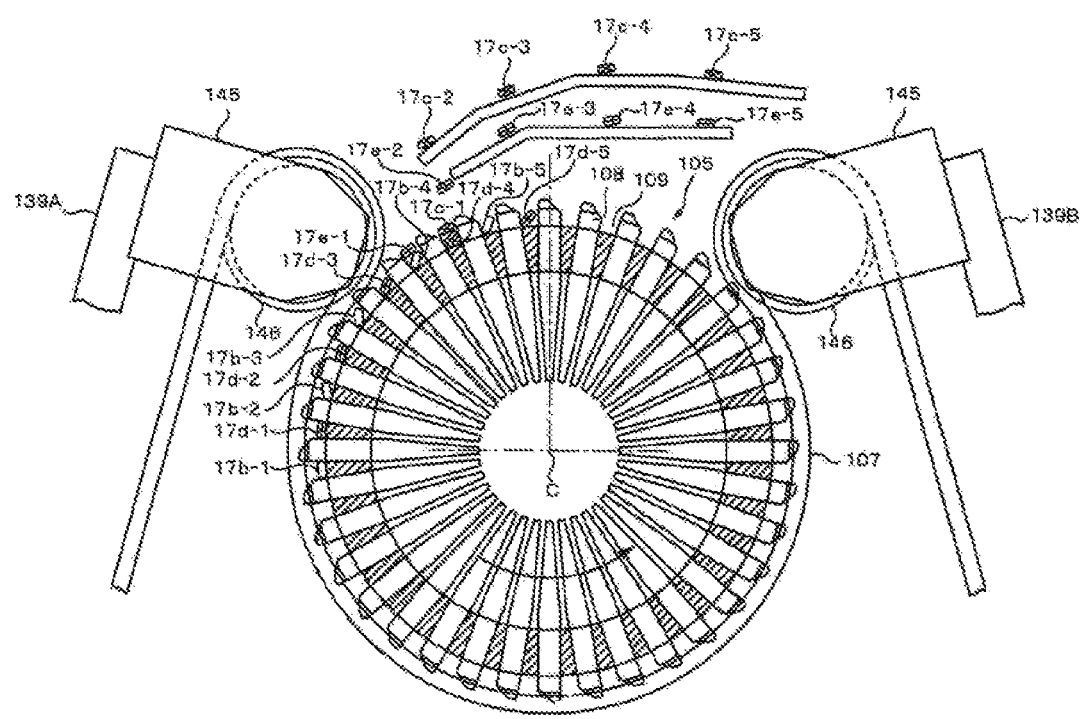
FIG. 22C is an essential part sectional view illustrating the state where a rear leg of the second coil segment is inserted into the segment hold section before a rear leg of the first coil segment, in the coil assembling apparatus in the second embodiment.

When the large width coil segment 17S and the small width coil segment 17SS are alternately arranged, the rear leg 17*e*-1 of the second small width coil segment 17SS falls earlier than the rear leg 17*c*-1 of the first large width coil segment 17S and is arranged as shown in FIG. 22C. The lengths along the circumferential direction of the outer guide member 114 and the inner guide member 115 are set so that falling of the rear legs occur at such timing.

Figure 22D:
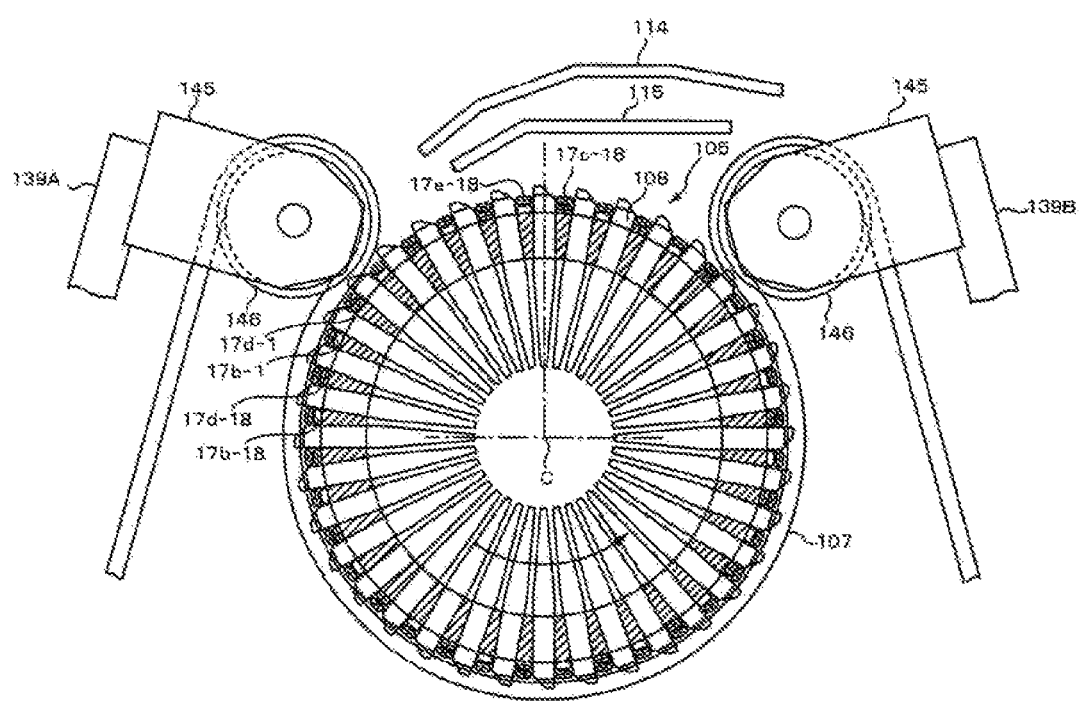
FIG. 22D is an essential part sectional view illustrating the state where the coil segments of a first lap are inserted into the segment hold section, in the coil assembling apparatus in the second embodiment.
Figure 23:
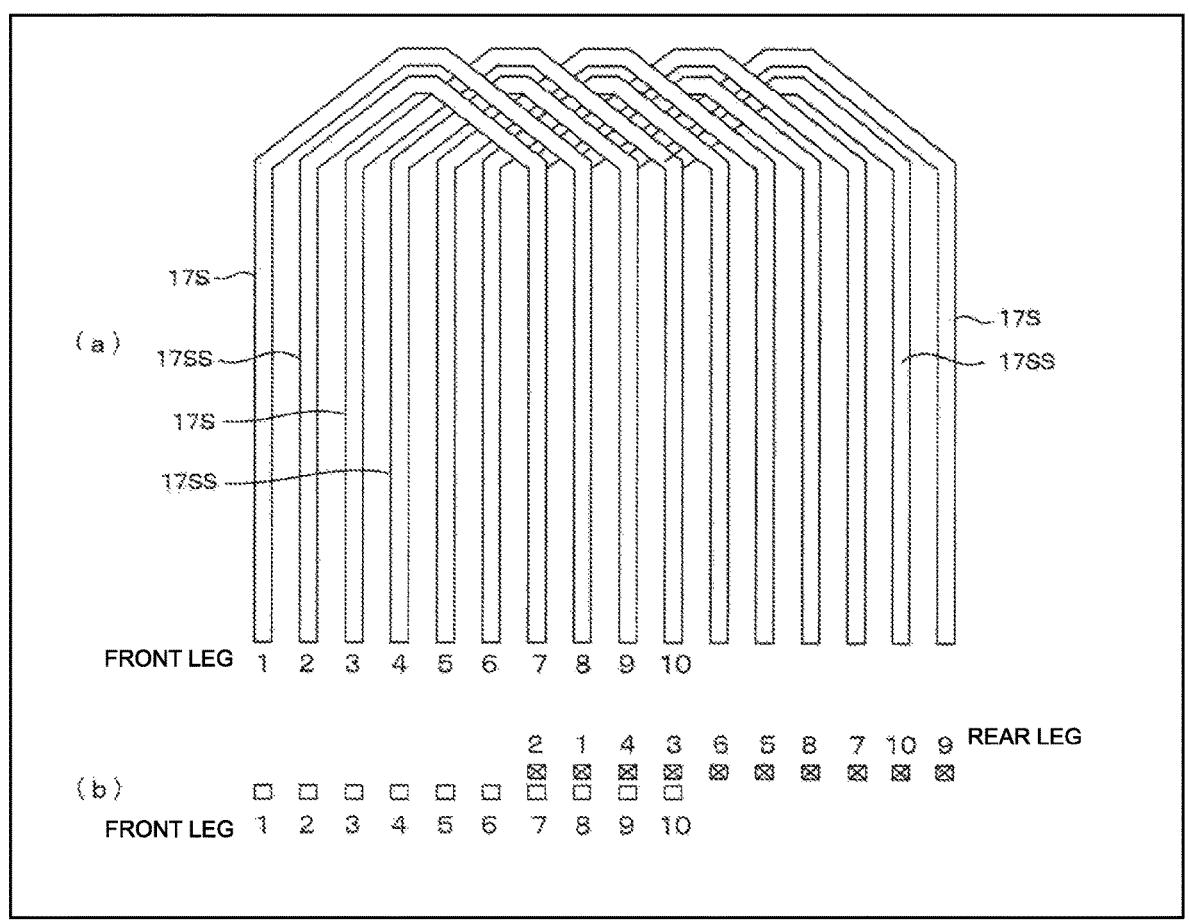
FIG. 23 is a developed view illustrating assembling order of two kinds of coil segments assembled in the coil assembling apparatus in the second embodiment.

FIG. 22D shows the state where the arrangement of the coil segments of the first round is completed. It is possible to arrange the coil segments in a more complicated pattern by configuring three or more stages (layers) of the guide members According to this second embodiment, as for the coil segments to be supplied to the coil assembling section 2, the large width coil segments 17S and the small width coil segments 17SS are alternately arranged as shown in FIG. 23. In this case, not simple pattern of arrangement will be performed as that the rear legs (2) and (4) of the second and fourth small width coil segments 17SS are arranged earlier than the arrangement of the rear legs (1) and (3) of the first and third large width coil segments 17S. Namely, when ten coil segments 17S and 17SS are arranged and expanded, the rear legs of the second coil segment 17SS, of the first coil segment 17S, of the fourth coil segment 17SS and of the third coil segment 17S are arranged on the front legs of the seventh coil segment 17SS, of the eighth coil segment 17S, of the ninth coil segment 17SS and of the tenth coil segment 17S, respectively.

Although preferred embodiments of the present invention are described, the present invention is not limited to such specific embodiments described in the specification, except as defined in the appended claims. But many widely different embodiments of the present invention may be constructed without departing from the spirit and scope of the present invention. The advantages described in the embodiment of the present invention are merely preferable advantages but the advantages of the present invention are not limited to that described in the specification.

DENOTATION OF REFERENCE NUMERALS

1: coil segment shaping section
2: coil assembling section
3: wire rod providing section
4: first bending section
5: second bending section
6: wire rod
7: bobbin
8: feed direction switching section
9: correction transport section
9*a*, 9*b*: roller pair
10: peeling section
11: cutting section
12: feed mechanism
13: hold member
17*a*, 17*a*': linking portion
17*b*, 17*c*: slot insertion portion
17*a*, 17*a*': linking portion
17*b*, 17*c*: slot insertion portion
17*b*-1, 17*b*-2, 17*b*-3, 17*b*-8: front leg
17*c*-1, 17*c*-2, 17*c*-3: rear leg
17S, 17SS, 17S', 17SS': coil segment
45: HMI
46: PLC
47: first NC controller
48: second NC controller
49: control unit
50, 51: optical communication cable
100: manufacturing apparatus of electrical rotating machine
105, 105': segment arrangement drum
106: separation preventing means
107: belt
108, 108': blade
108*a*: groove
108*b*: tapered surface
109, 109*a*, 109' segment hold portion
110: segment transport means
111: chucking portion
112, 112', 113: guide member
112*a*: guide piece
112*b*, 114*b*, 115*b*, 163: bracket
112*c*, 114*c*, 115*c*: guide surface
113: guide means
114: outer guide member
115: inner guide member
116, 136, 157: base
117, 127, 133, 161: servomotor
118: blade adjustment mechanism
119: push-out mechanism
120: work support base
121: rotation axis
122: bearing
123: large diameter gear
124: receiving portion
125, 131, 159: ball-screw portion
126, 132, 160: nut portion
128, 134: slide member
128*a*, 128*b*, 134*a*, 134*b*, 139A, 139B: arm
129: engagement portion
129*a*: annular groove
130: conical cam
135: press ring 136a, 165: rail
137: column
138: work carrying portion
138a: concave portion
140: axis
141A, 141B: rack member
142: pinion gear
144: horizontal bar
145: holder
146: movable pulley
147, 148: fixed pulley
149: tension pulley
150: support shaft
151, 167: air cylinder
152: core
153: insertion guide unit
154: cuffs supporter
154a: projection
155: cuffs portion
158: drive mechanism
162: slider
164: drive pawl
166: turning base
170: detection sensor

The invention claimed is:

1. A coil assembling apparatus comprising: a transport means for transporting in sequence a plurality of coil segments, each of said plurality of coil segments consisting of a pair of slot insertion portions extending substantially in parallel with each other and a linking portion for coupling said pair of slot insertion portions; a segment arrangement body capable of rotating around a center axis thereof and provided with a plurality of segment hold portions annularly arranged along a circumferential direction of said segment arrangement body, into which said plurality of coil segments transported by said transport means can be respectively inserted from an outer radial directions of said segment arrangement body; and a guide means for guiding to insert one slot insertion portion of said pair of slot insertion portions of each of said coil segments into one of said segment hold portions each time said segment arrangement body rotates by a first predetermined angle, and for guiding to insert the other one slot insertion portion of said pair of slot insertion portions into the other one of said segment hold portions when said segment arrangement body rotates by a second predetermined angle from the insertion of the one slot insertion portion, wherein said segment arrangement body is arranged so that the rotation center axis thereof is horizontally-supported, and wherein said guide means is arranged above said segment arrangement body.

2. The coil assembling apparatus as claimed in claim 1, wherein said guide means is configured that the one slot insertion portion of said pair of slot insertion portions passes through between said guide means and said segment arrangement body, and that the other one slot insertion portion of said pair of slot insertion portions passes through the opposite side of said guide means with respect to said segment arrangement body.

3. The coil assembling apparatus as claimed in claim 2, wherein said guide means has a single layer configuration consisting of a single guide member.

4. The coil assembling apparatus as claimed in claim 2, wherein said guide means has a two layer configuration consisting of an outer guide member and an inner guide member located nearer than said outer guide member with respect to the center axis of said segment arrangement body, and wherein a length of said inner guide member along the circumferential direction of said segment arrangement body is shorter than a length of said outer guide member along the circumferential direction of said segment arrangement body.

5. The coil assembling apparatus as claimed in claim 2, wherein said transport means is configured to grip the other one slot insertion portion of said pair of slot insertion portions for transporting each of said plurality of coil segments so that the other one slot insertion portion of said pair of slot insertion portions is laid on said guide means in the state where the one slot insertion portion is inserted into one segment hold portion of said plurality of segment hold portions.

6. The coil assembling apparatus as claimed in claim 1, wherein said plurality of segment hold portions of said segment arrangement body are arranged between a plurality of blades that are extended to a radial direction of said segment arrangement body and annually arranged along a circumferential direction of said segment arrangement body, and wherein heights in the radial direction of said plurality of blades are variable depending on the number of layers of said plurality of coil segments.

7. The coil assembling apparatus as claimed in claim 1, wherein said apparatus further comprises a separation preventing means for supporting said plurality of coil segments arranged in said plurality of segment hold portions of said segment arrangement body so as to prevent separation of said plurality of coil segments from said plurality of segment hold portions.

8. The coil assembling apparatus as claimed in claim 7, wherein said separation preventing means has an abutment member for performing abutment along the peripheral surface of said segment arrangement body, an abutment pressure of said abutment member being adjustable depending on the number of layers of said plurality of coil segments.

9. The coil assembling apparatus as claimed in claim 8, wherein said abutment member comprises a belt body for performing co-rotation depending on the rotation of said segment arrangement body.

10. The coil assembling apparatus as claimed in claim 1, wherein said apparatus further comprises a push-out mechanism for pushing out the plurality of coil segments held in said plurality of segment hold portions of said segment arrangement body, to the axial direction of said segment arrangement body.

11. A coil assembling method comprising the steps of: preparing a segment arrangement body provided with a plurality of segment hold portions annularly arranged along a circumferential direction of said segment arrangement body, into which a plurality of coil segments can be respectively inserted from an outer radial directions of said segment arrangement body, each of said plurality of coil segments consisting of a pair of slot insertion portions extending substantially in parallel with each other and a linking portion for coupling said pair of slot insertion portions; guiding, by a guide means, to insert one slot insertion portion of said pair of slot insertion portions of each of said coil segments into one of said segment hold portions each time said segment arrangement body rotates by a first predetermined angle; and guiding, by said guide means, to insert the other one slot insertion portion of said pair of slot insertion portions into the other one of said segment hold portions when said segment arrangement body rotates by a second predetermined angle from the insertion of the one slot insertion portion, wherein said segment arrangement body is arranged so that the rotation center axis thereof is horizontally-supported, and wherein said guide means is arranged above said segment arrangement body.

12. A manufacturing apparatus of an electrical rotating machine including a coil assembling apparatus, said coil assembling apparatus comprising: a transport means for transporting in sequence a plurality of coil segments, each of said plurality of coil segments consisting of a pair of slot insertion portions extending substantially in parallel with each other and a linking portion for coupling said pair of slot insertion portions; a segment arrangement body capable of rotating around a center axis thereof and provided with a plurality of segment hold portions annularly arranged along a circumferential direction of said segment arrangement body, into which said plurality of coil segments transported by said transport means can be respectively inserted from an outer radial directions of said segment arrangement body; and a guide means for guiding to insert one slot insertion portion of said pair of slot insertion portions of each of said coil segments into one of said segment hold portions each time said segment arrangement body rotates by a first predetermined angle, and for guiding to insert the other one slot insertion portion of said pair of slot insertion portions into the other one of said segment hold portions when said segment arrangement body rotates by a second predetermined angle from the insertion of the one slot insertion portion, wherein said segment arrangement body is arranged so that the rotation center axis thereof is horizontally-supported, and wherein said guide means is arranged above said segment arrangement body.

13. A manufacturing apparatus of an electrical rotating machine including a wire rod providing section for supplying a linear wire rod, a first bending section for bending said linear wire rod supplied from said wire rod providing section, in a plane to form a predetermined shap consisting of a pair of slot insertion portions extending substantially in parallel with each other and a linking portion for coupling said pair of slot insertion portions, a second bending section for bending the wire rod bent in said first bending section, in a plane perpendicular to said plane, and a coil assembling apparatus for assembling coil segments bent in said second bending section, in line with slots of the electrical rotating machine, said coil assembling apparatus comprising: a transport means for transporting in sequence a plurality of coil segments, each of said plurality of coil segments consisting of a pair of slot insertion portions extending substantially in parallel with each other and a linking portion for coupling said pair of slot insertion portions; a segment arrangement body capable of rotating around a center axis thereof and provided with a plurality of segment hold portions annularly arranged along a circumferential direction of said segment arrangement body, into which said plurality of coil segments transported by said transport means can be respectively inserted from an outer radial directions of said segment arrangement body; and a guide means for guiding to insert one slot insertion portion of said pair of slot insertion portions of each of said coil segments into one of said segment hold portions each time said segment arrangement body rotates by a first predetermined angle, and for guiding to insert the other one slot insertion portion of said pair of slot insertion portions into the other one of said segment hold portions when said segment arrangement body rotates by a second predetermined angle from the insertion of the one slot insertion portion, wherein said segment arrangement body is arranged so that the rotation center axis thereof is horizontally-supported, and wherein said guide means is arranged above said segment arrangement body.

14. The manufacturing apparatus of an electrical rotating machine as claimed in claim 13, wherein said guide means is configured that the one slot insertion portion of said pair of slot insertion portions passes through between said guide means and said segment arrangement body, and that the other one slot insertion portion of said pair of slot insertion portions passes through the opposite side of said guide means with respect to said segment arrangement body.

15. The manufacturing apparatus of an electrical rotating machine as claimed in claim 14, wherein said guide means has a single layer configuration consisting of a single guide member.

16. The manufacturing apparatus of an electrical rotating machine as claimed in claim 14, wherein said guide means has a two layer configuration consisting of an outer guide member and an inner guide member located nearer than said outer guide member with respect to the center axis of said segment arrangement body, and wherein a length of said inner guide member along the circumferential direction of said segment arrangement body is shorter than a length of said outer guide member along the circumferential direction of said segment arrangement body.

17. The manufacturing apparatus of an electrical rotating machine as claimed in claim 14, wherein said transport means is configured to grip the other one slot insertion portion of said pair of slot insertion portions for transporting each of said plurality of coil segments so that the other one slot insertion portion of said pair of slot insertion portions is laid on said guide means in the state where the one slot insertion portion is inserted into one segment hold portion of said plurality of segment hold portions.

18. The manufacturing apparatus of an electrical rotating machine as claimed in claim 13, wherein said plurality of segment hold portions of said segment arrangement body are arranged between a plurality of blades that are extended to a radial direction of said segment arrangement body and annually arranged along a circumferential direction of said segment arrangement body, and wherein heights in the radial direction of said plurality of blades are variable depending on the number of layers of said plurality of coil segments.

19. The manufacturing apparatus of an electrical rotating machine as claimed in claim 13, wherein said apparatus further comprises a separation preventing means for supporting said plurality of coil segments arranged in said plurality of segment hold portions of said segment arrangement body so as to prevent separation of said plurality of coil segments from said plurality of segment hold portions.

20. The manufacturing apparatus of an electrical rotating machine as claimed in claim 19, wherein said separation preventing means has an abutment member for performing abutment along the peripheral surface of said segment arrangement body, an abutment pressure of said abutment member being adjustable depending on the number of layers of said plurality of coil segments.

21. The manufacturing apparatus of an electrical rotating machine as claimed in claim 20, wherein said abutment member comprises a belt body for performing co-rotation depending on the rotation of said segment arrangement body.

22. The manufacturing apparatus of an electrical rotating machine as claimed in claim 13, wherein said apparatus further comprises a push-out mechanism for pushing out the plurality of coil segments held in said plurality of segment hold portions of said segment arrangement body, to the axial direction of said segment arrangement body.

* * * * *